US010122505B2

(12) United States Patent
Yokomakura et al.

(10) Patent No.: US 10,122,505 B2
(45) Date of Patent: Nov. 6, 2018

(54) WIRELESS COMMUNICATION SYSTEM, WIRELESS COMMUNICATION DEVICE, AND WIRELESS COMMUNICATION METHOD

(75) Inventors: Kazunari Yokomakura, Osaka (JP); Yasuhiro Hamaguchi, Osaka (JP); Shimpei To, Osaka (JP); Osamu Nakamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 650 days.

(21) Appl. No.: 12/989,942

(22) PCT Filed: Apr. 28, 2009

(86) PCT No.: PCT/JP2009/058422
§ 371 (c)(1),
(2), (4) Date: Oct. 27, 2010

(87) PCT Pub. No.: WO2009/133916
PCT Pub. Date: Nov. 5, 2009

(65) Prior Publication Data
US 2011/0038346 A1 Feb. 17, 2011

(30) Foreign Application Priority Data
Apr. 28, 2008 (JP) .................. P2008-117759

(51) Int. Cl.
*H04W 52/18* (2009.01)
*H04L 5/00* (2006.01)
*H04L 27/26* (2006.01)

(52) U.S. Cl.
CPC ........... *H04L 5/0039* (2013.01); *H04L 5/006* (2013.01); *H04L 5/0094* (2013.01); *H04L 27/2614* (2013.01); *H04L 5/0007* (2013.01)

(58) Field of Classification Search
CPC ..................................... H04W 52/04–52/38
(Continued)

(56) References Cited

U.S. PATENT DOCUMENTS

2002/0075840 A1* 6/2002 Vadde ................... 370/343
2007/0264936 A1* 11/2007 Kim et al. ............. 455/45
(Continued)

FOREIGN PATENT DOCUMENTS

JP 2007-221745 A 8/2007
WO WO 2006/130742 A1 12/2006
WO WO 2007/141848 A1 12/2007

OTHER PUBLICATIONS

Fujitsu, PAPR of UL access schemes, 3 GPP TSG-RAN1 #54bis, R1-083780, Sep. 29, 2008.
(Continued)

*Primary Examiner* — Andrew W Chriss
*Assistant Examiner* — Kenan Cehic
(74) *Attorney, Agent, or Firm* — Birch, Stewart, Kolasch, & Birch, LLP

(57) ABSTRACT

A wireless communication system includes a first communication device which arranges a frequency signal into which a single carrier signal is converted by time-to-frequency conversion in subcarriers and wirelessly transmits a resultant signal and a second communication device which receives the signal wirelessly transmitted by the first communication device. The wireless communication system includes a selection unit which calculates, for each determined selection candidate as a combination of a predetermined segment size and information indicating predetermined average transmission power, a value indicating reception quality in the second communication device upon transmission by the first communication device by using an arrangement using the predetermined segment size, and the
(Continued)

predetermined average transmission power, and which selects a selection candidate to be used upon transmission by the first communication device from among the selection candidates based on the calculated value indicating the reception quality. Therefore, an excellent transmission efficiency is obtained.

6 Claims, 20 Drawing Sheets

(58) Field of Classification Search
USPC .................................. 370/206–210, 310–350
See application file for complete search history.

(56) References Cited

U.S. PATENT DOCUMENTS

| | | | | |
|---|---|---|---|---|
| 2007/0280097 | A1* | 12/2007 | Yang et al. | 370/206 |
| 2007/0280365 | A1* | 12/2007 | Seki | H04L 27/2636 375/260 |
| 2007/0287465 | A1* | 12/2007 | Hyon et al. | 455/450 |
| 2007/0291633 | A1* | 12/2007 | Kim et al. | 370/203 |
| 2008/0043812 | A1* | 2/2008 | Moffatt | 375/133 |
| 2009/0247209 | A1* | 10/2009 | Cho | H04W 52/226 455/522 |
| 2010/0172316 | A1* | 7/2010 | Hwang | H04L 5/0007 370/330 |
| 2010/0254342 | A1* | 10/2010 | Cho | H04L 5/0007 370/330 |

OTHER PUBLICATIONS

Hideo Namba et al., "A Study on Dynamic Spectrum Control Considering PAPR", Proceedings of the IEICE General Conference 2008, p. 436, B-5-50, Mar. 5, 2008 (with partial English translation).
Jianhua Zhang et al., "Comparison of the Link Level Performance betwen OFDMA and SC-FDMA", Communications and Networking in China, 2006. ChinaCom '06. First International Conference on Oct. 25, 2006, pp. 1-6.
Mashima and Sampei, "A Study on Broadband Single Carrier Transmission Technique Using Dynamic Spectrum Control," RCS 2006-233, Jan. 2007 (including English abstract in front page.).
Myung, H.G. et al., "Single Carrier FDMA for Uplink Wireless Transmission", Vehicular Technology Magazine, IEEE, Sep. 2006 pp. 30-38.
Ruiz de Temino et al., "Channel-Aware Scheduling Algorithms for SC-FDMA in LTE Uplink", Personal Indoor and Mobile Radio Communications, 2008. PIMRC 2008. IEEE 19th International Symposium on Sep. 15, 2008, pp. 1-6.
Goto, et al., IEICE Technical Report, RCS2005-15(Apr. 2005), "Comparison of Throughput Performance between Single-carrier DS-CDMA and OFDM Radio Access in Uplink Broadband Channel for Multi-cell Environments" (Apr. 15, 2005), vol. 105, No. 15, pp. 49-55, The Institute of Electronics, Information and Communication Engineers, Tokyo, Japan.
Sampei et al., "Flexible Spectrum Control and Receiver Performance Improvement Technologies for B3G Wireless Systems," 17th Annual IEEE International Symposium on Personal, Indoor and Mobile Radio Communications (PIMRC'06), Sep. 2006, 5 pages, XP031023900.

* cited by examiner

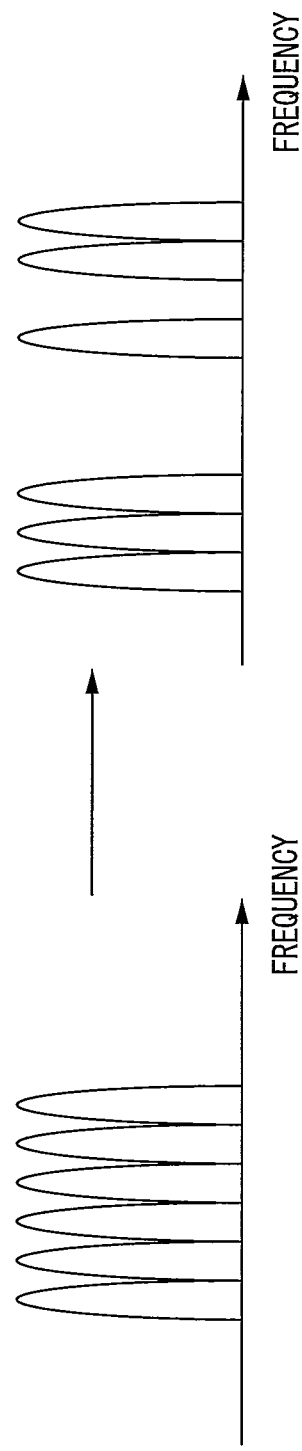

WIRELESS COMMUNICATION SYSTEM, WIRELESS COMMUNICATION DEVICE, AND WIRELESS COMMUNICATION METHOD

TECHNICAL FIELD

The present invention relates to a wireless communication system, a wireless communication device, and a wireless communication method.

This application claims priority to and the benefits of Japanese Patent Application No. 2008-117759 filed on Apr. 28, 2008, the disclosure of which is incorporated herein by reference.

BACKGROUND ART

Recently, next-generation mobile communication systems have been actively studied. As a method for enhancing the frequency utilization efficiency of a system, a single-frequency reuse cellular system has been proposed in which respective cells use the same frequency band so that the cells can use the entire band allocated to the system.

Orthogonal frequency division multiple access (OFDMA) is the most prominent candidate for downlink (communication from a base station device to a mobile station). OFDMA is a communication system in which information data is modulated by use of different modulation schemes, such as 64-ary quadrature amplitude modulation (64QAM) and binary phase shift keying (BPSK), according to reception conditions to generate an OFDM signal, and radio resources defined by time and frequency axes are flexibly allocated to a plurality of mobile user devices.

Since an OFDM signal is used in this case, a peak to average power ratio (PAPR) may greatly increase and peak power may increase. The high peak power is not a large problem for downlink communication having a relatively high transmission power amplification function, but there is a fatal problem in that a signal to be transmitted is distorted since peak power exceeds a linear region of an amplifier (AMP) upon amplification for uplink communication (from the mobile station to the base station device) having a low transmission power amplification function.

Thus, a single-carrier-based communication scheme with a low PAPR is suitable for the uplink (communication from the mobile station to the base station device).

However, the use of the single-carrier scheme has a problem in that flexible resource allocation using time and frequency axes may not be performed such as in the case of OFDM. As a communication scheme for solving the problem, single carrier-adaptive spectrum allocation (SC-ASA) (also referred to as discrete Fourier transform-spread OFDM (DFT-S-OFDM)) has been proposed. (see, for example, Non-Patent Document 1).

Since such a communication scheme uses the same technique as the single-carrier communication scheme, a PAPR becomes low. It is possible to process data without inter-block interference by inserting a cyclic prefix (CP) as in an OFDM signal (hereinafter, an interval at which a CP is inserted, that is, a data processing unit in which a DFT is performed, is called a "DFT-S-OFDM" symbol). Since frequency waveforms are first produced by a DFT, there is a merit in that resource control may be easily performed in a subcarrier unit.

FIGS. 17A and 17B are diagrams illustrating the concept of the SC-ASA scheme. FIG. 17A shows a transmission spectrum. A spectrum of original transmission data converted by time-to-frequency conversion into a frequency signal is arranged in a continuous frequency as shown in a graph shown on the left of FIG. 17A. In the SC-ASA scheme, a spectrum is transmitted by remapping subcarriers as in a graph shown on the right of FIG. 17A after selecting the subcarriers of which a reception situation (reception quality) is good at a receiver. A graph shown on the left of FIG. 17B shows a reception spectrum, and a frequency signal received as in a graph shown on the right of FIG. 17B can be recovered to the original by performing demapping to the same sequence as that of the original transmission data. That is, transmission characteristics are improved since a frequency of a good reception situation can be adaptively selected and transmitted.

FIGS. 18A and 18B are schematic block diagrams showing the configurations of a transmission station device and a reception station device which transmit information by applying the SC-ASA communication scheme. In the transmission station device of FIG. 18A, a transmission bit sequence is coded by an encoding unit 1000, and coded transmission bits are rearranged by an interleaving unit 1001 and modulated by a modulation unit 1002. After a serial/parallel (S/P) conversion unit 1003 converts a modulation signal modulated by the modulation unit 1002 into parallel signals, a DFT unit 1004 converts the parallel signals into signals on a frequency axis. Thereafter, a spectrum mapping unit 1005 maps the signals on the frequency axis to subcarriers. At this time, in a process of mapping to the subcarriers, subcarriers of a frequency of which a reception situation, for example, a signal to noise ratio (SNR) or a signal to noise interference ratio (SNIR), is good are allocated to the frequency, and also 0 is input to unallocated subcarriers.

Next, an inverse IDFT (inverse discrete Fourier transform) unit 1006 converts the mapped transmission signals on the frequency axis into signals on a time axis, and a parallel/serial (P/S) conversion unit 1007 converts the signals on the time axis into a serial signal. Simultaneously, a pilot signal generation unit 1008 generates a pilot signal for estimating a frequency characteristic of a propagation channel, and a pilot multiplexing unit 1009 multiplexes the pilot signal with the serial data signal by conversion of the P/S conversion unit 1007. A CP insertion unit 1010 inserts a CP into a multiplexed signal. The signal into which the CP is inserted is converted by a D/A conversion unit 1011 into an analog signal, up-converted by a radio unit 1012 into a radio frequency, and transmitted from a transmission antenna 1013 in each transmission station.

In the reception station device of FIG. 18B, a received signal is received by a reception antenna 1100. A radio unit 1101 down-converts the received signal into a baseband signal. An A/D conversion unit 102 converts the down-converted received signal into a digital signal. Next, a CP removal unit 1103 removes a CP from the digital signal, and a pilot separation unit 1104 separates a pilot signal for estimating a propagation channel characteristic and a data signal. A propagation channel estimation and noise variance estimation unit 1105 calculates a frequency characteristic of a propagation channel and a variance of noise from the separated pilot signal.

A propagation channel characteristic demapping unit 1106 extracts only a frequency characteristic actually used for transmission from the estimated frequency characteristic of the propagation channel, and a discrete frequency selection unit 1107 selects a discrete frequency of which a reception situation is good. At this time, a spectrum allocation process calculates reception situations of discrete frequencies and selects discrete frequencies to be used in order from a frequency having a high gain. A spectrum allocation information generation unit 1108 generates an allocation information signal of the next transmission opportunity from determined spectrum allocation, and feeds back the allocation information signal to a transmission device.

On the other hand, an S/P conversion unit 1109 converts the separated data signal from which the CP is removed into parallel digital signals. A DFT unit 1110 converts the parallel digital signals into frequency-axis signals, and a spectrum demapping unit 1111 forms the same spectrum sequence as that of the original transmission signal by returning subcarriers of the frequency-axis signals to the original arrangement. Thereafter, an equalization unit 1112 performs an equalization process of compensating for distortion by a propagation channel, and an IDFT unit 1113 converts the frequency-axis signals into time-axis signals. A P/S conversion unit 1114 converts the time-axis signals into a serial signal, and a demodulation unit 1115 performs demodulation into reliabilities (likelihoods) of code bit units from a modulated signal. Finally, a deinterleaving unit 116 returns a coded transmission bit sequence to the original from the likelihood of each code bit, and a decoding unit 1117 obtains decoded data of a signal transmitted from a transmission station.

Non-Patent Document 1: Mashima and Sampei, "A Study on Broadband Single Carrier Transmission Technique using Dynamic Spectrum Control," RCS 2006-233, January 2007.

DISCLOSURE OF INVENTION

Problem to be Solved by the Invention

In the above-described SC-ASA communication scheme, a distributed arrangement in which subcarriers in which a frequency signal is to be arranged are distributed in a frequency direction and a continuous arrangement in which subcarriers are continuous in the frequency direction are used as a method of arranging a frequency signal in subcarriers. The distributed arrangement enables subcarriers having good transmission characteristics to be selected since a degree of freedom is high when subcarriers in which a frequency signal is to be arranged are selected, but is characterized by a higher PAPR than that of the continuous arrangement. The continuous arrangement may not select subcarriers having best transmission characteristics since a limit is applied when subcarriers in which a frequency signal is to be arranged are selected, but is characterized by a lower PAPR than the distributed arrangement. Thus, there is a method of using the continuous arrangement when transmission power is high and using the distributed arrangement when transmission power is low.

However, when the transmission power is high in a method of switching the distributed arrangement and the continuous arrangement by the above-described transmission power, there is a problem in that a frequency signal may not be arranged in subcarriers with best transmission efficiency by the use of the continuous arrangement, despite the fact that it is better for good transmission characteristics to decrease average transmission power while using the distributed arrangement having a high degree of freedom of subcarrier selection even when the PAPR is high than to decrease peak power by using the continuous arrangement having a low PAPR.

The present invention has been made in view of the above-described circumstances, and an object of the invention is to provide a wireless communication system, a wireless communication device, and a wireless communication method capable of obtaining excellent transmission efficiency in a communication scheme of arranging a frequency signal into which a single carrier signal is converted by time-to-frequency conversion in subcarriers and transmitting a resultant signal.

Means for Solving the Problem

The present invention has been made to solve the above-described problem. According to an aspect of the present invention, there is provided a wireless communication system including a first communication device which arranges a frequency signal into which a single carrier signal is converted by time-to-frequency conversion in subcarriers and wirelessly transmits a resultant signal and a second communication device which receives the signal wirelessly transmitted by the first communication device, the wireless communication system including: a selection unit which calculates, for each previously determined selection candidate as a combination of a predetermined segment size and information indicating predetermined average transmission power, a value indicating reception quality in the second communication device upon transmission by the first communication device by using an arrangement in which a frequency signal is segmented in each segment size of the selection candidate and frequency signals constituting segments are arranged in continuous subcarriers among arrangements of the frequency signal in subcarriers, and the average transmission power of the selection candidate, and which selects a selection candidate to be used upon transmission by the first communication device from among the selection candidates based on the calculated value indicating the reception quality.

According to the wireless communication system, the selection candidate may be the combination of the predetermined segment size and the predetermined average transmission power in which peak power of transmission power when the first communication device transmits a signal does not exceed a predetermined threshold value.

According to the wireless communication system, the selection unit may set an arrangement of the frequency signal in subcarriers used upon calculation of the reception quality as an arrangement in subcarriers having a best reception state among subcarriers in which the frequency signal is capable of being arranged among frequency signal arrangements in the segment size of the selection candidate.

According to the wireless communication system, the second communication device may include: the selection unit; a control information generation unit which generates spectrum allocation information indicating the arrangement used upon calculation of the reception quality of the selection candidate selected by the selection unit and transmission power information indicating the predetermined average transmission power of the selection candidate; and a selection result transmission unit which transmits the spectrum allocation information and the transmission power information generated by the control information generation unit, and the first communication device may include: a selection result reception unit which receives the spectrum allocation information and the transmission power information; a mapping unit which arranges the frequency signal in subcarriers according to the received spectrum allocation information; and a transmission unit which transmits the signal arranged by the mapping unit at the predetermined average transmission power based on the received transmission power information.

According to the wireless communication system may include a plurality of first communication devices and the second communication device, wherein the second communication device includes a measurement unit which measures an attenuation amount of a signal received from each of the first communication devices, and the selection unit selects the combination for the first communication device of a largest attenuation amount in a measurement result of the measurement unit among the first communication devices, and sets segment sizes for the first communication devices other than the first communication device of the largest attenuation amount to be less than or equal to a segment size of the selected combination.

According to the wireless communication system, when the value indicating the reception quality for the first communication device is calculated, the selection unit may generate a subchannel from a frequency band in which a spectrum is assignable for each segment size, and arranges the segment in the subchannel.

According to the wireless communication system, the selection unit may determine average transmission power based on the attenuation amount of the first communication device for the first communication devices other than the first communication device of the largest attenuation amount, and use a segment size of a selection candidate selected from among the selection candidates having the predetermined average transmission power higher than the average transmission power.

According to another aspect of the present invention, there is provided a wireless communication device which receives a signal wirelessly transmitted by another wireless communication device arranging a frequency signal into which a single carrier signal is converted by time-to-frequency conversion in subcarriers, the wireless communication device including: a selection unit which calculates, for each previously determined selection candidate as a combination of a predetermined segment size and predetermined average transmission power, a value indicating reception quality in the communication device upon transmission by the other wireless communication device by using an arrangement in which a frequency signal is segmented in each segment size of the selection candidate and frequency signals constituting segments are arranged in continuous subcarriers among arrangements of the frequency signal in subcarriers and the average transmission power of a selection candidate, and which selects a selection candidate to be used upon transmission by the other communication device from among the selection candidates based on the calculated value indicating the reception quality; a control information generation unit which generates spectrum allocation information indicating the arrangement used upon calculation of the reception quality of the selection candidate selected by the selection unit, and transmission power information indicating the predetermined average transmission power of the selection candidate; and a selection result transmission unit which transmits the spectrum allocation information and the transmission power information generated by the control information generation unit to the other wireless communication device.

According to still another aspect of the present invention, there is provided a wireless communication method for use in a wireless communication system including a first communication device which arranges a frequency signal into which a single carrier signal is converted by time-to-frequency conversion in subcarriers and wirelessly transmits a resultant signal and a second communication device which receives the signal wirelessly transmitted by the first communication device, the wireless communication method including: calculating, by the first or second communication device, for each previously determined selection candidate as a combination of a predetermined segment size and information indicating predetermined average transmission power, a value indicating reception quality in the second communication device upon transmission by the first communication device by using an arrangement in which a frequency signal is segmented in each segment size of a selection candidate and frequency signals constituting segments are arranged in continuous subcarriers among arrangements of the frequency signal in subcarriers, and the average transmission power of the selection candidate, and selecting a selection candidate to be used upon transmission by the first communication device from among the selection candidates based on the calculated value indicating the reception quality.

Effect of the Invention

According to the present invention, reception qualities are respectively calculated for selection candidates as combinations of predetermined segment sizes and predetermined average transmission powers, and a selection candidate to be used upon transmission is selected from among the selection candidates based on values indicating the calculated reception qualities, so that excellent transmission efficiency is obtained.

BRIEF DESCRIPTION OF THE DRAWINGS

FIG. 17A is a diagram showing a transmission spectrum of an SC-ASA scheme of the related art.

BEST MODE FOR CARRYING OUT THE INVENTION

First Embodiment

A wireless communication system according to the first embodiment of the present invention will now be described with reference to the drawings. The wireless communication system according to this embodiment includes one first communication device (another wireless communication device) 100 and one second communication device (wireless communication device) 200, and a transmission scheme from the first communication device 100 to the second communication device 200 is an SC-ASA scheme. The number of subcarriers used for transmission by the first communication device 100 is set as the number of used subcarriers, $N_u$, and the number of subcarriers of an available band is set as the total number of subcarriers, $N_d$. Hereinafter, description is given using $N_d$ and $N_u$. Since an OFDM scheme is assumed to be a multicarrier scheme, the SC-ASA scheme may also be referred to as DFT-S-OFDM in this specification. Unless otherwise noted in the following embodiments, the case where the SC-ASA is used for uplink in communication from a generally known mobile station (the first communication device) to a base station (the second communication device) will be described, but communication serving as an object of the present invention is not limited thereto.

This embodiment is a control technique for the case where one user (the first communication device 100) performs transmission in the SC-ASA scheme. Since the number of first communication devices 100 which perform transmission in the SC-ASA scheme is 1 in this embodiment, it is possible to set a discrete frequency to be freely used without considering the contention with another communication device. Thus, the second communication device 200 determines spectrum allocation (an arrangement of a frequency signal in subcarriers) and generates spectrum allocation information in this embodiment, but the first communication device may determine the spectrum allocation and generate the spectrum allocation information.

Figure 1:
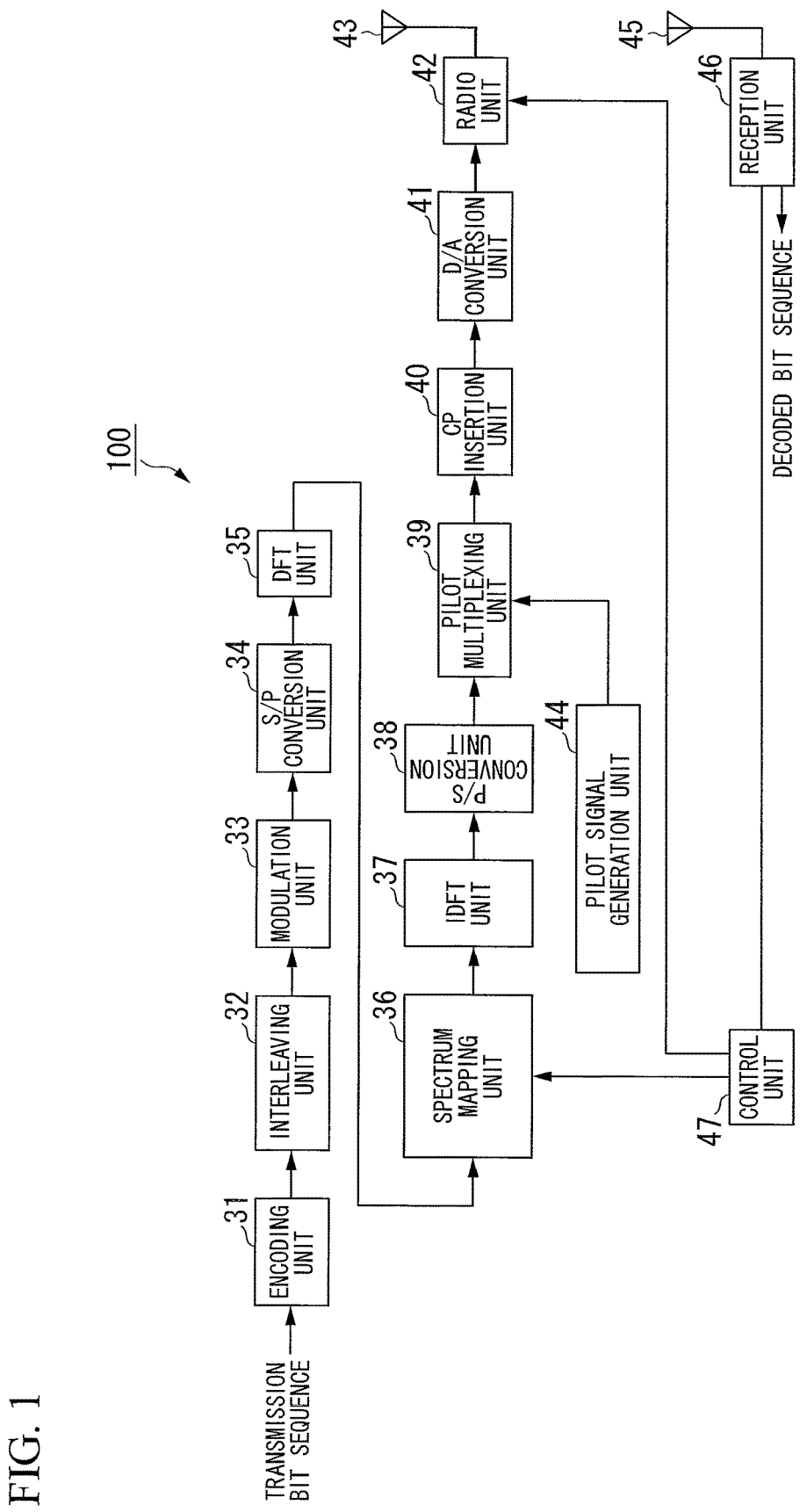
FIG. 1 is a schematic block diagram showing the configuration of a first communication device 100 according to a first embodiment of the present invention.

FIG. 1 is a schematic block diagram showing the configuration of the first communication device 100. The first communication device 100 includes an encoding unit 31, an interleaving unit 32, a modulation unit 33, an S/P (serial/parallel) conversion unit 34, a DFT (discrete Fourier transform) unit 35, a spectrum mapping unit 36, an IDFT (inverse discrete Fourier transform) unit 37, a P/S (parallel/serial) conversion unit 38, a pilot multiplexing unit 39, a CP (cyclic prefix) insertion unit 40, a D/A (digital/analog) conversion unit 41, a radio unit 42, a transmission antenna 43, a pilot signal generation unit 44, a reception antenna 45, a reception unit 46, and a control unit 47.

The encoding unit 31 codes a transmission bit sequence input to the first communication device 100. The interleaving unit 32 rearranges the order of time of bits of the coded transmission bit sequence. The modulation unit 33 generates a modulation signal (single carrier signal) by modulating the rearranged bit sequence. The S/P conversion unit 34 converts the modulation signal modulated by the modulation unit 33 into parallel modulation signals. The DFT unit 35 converts the parallel modulation signals into frequency signals as signals on a frequency axis by a DFT (time-to-frequency conversion). The spectrum mapping unit (mapping unit) 36 arranges (maps and spectrum-allocates) the frequency signals in subcarriers according to spectrum allocation information from the control unit 47. At this time, the spectrum mapping unit 36 inputs 0 to subcarriers in which no frequency signal is arranged.

The IDFT unit 37 converts the mapped frequency signals into signals on a time axis by an IDFT. The P/S conversion unit 38 converts the signals on the time axis into a serial signal. The pilot signal generation unit 44 generates a pilot signal for estimating a frequency characteristic of a propagation channel. The pilot multiplexing unit 39 multiplexes the pilot signal with the serial time-axis signal by conversion of the P/S conversion unit 38. The CP insertion unit 40 inserts a CP (cyclic prefix) into the multiplexed signal. The D/A conversion unit 41 converts the signal into which the CP is inserted into an analog signal. The radio unit (transmission unit) 42 up-converts the analog signal into a radio frequency, amplifies the up-converted signal to average transmission power indicated by transmission power information based on the transmission power information from the control unit 47, and transmits the amplified signal to the second communication device 200 via the transmission antenna 43.

The reception unit (selection result reception unit) 46 receives a signal from the second communication device 200 via the reception antenna 45, outputs control data including spectrum allocation information and transmission power information from the received signal to the control unit 47, and outputs a decoded bit sequence of data transmitted from the second communication device 200 to the outside. The control unit 47 receives the control data from the reception unit 46, outputs the spectrum allocation information within the control data to the spectrum mapping unit 36, and outputs the transmission power information to the radio unit 42.

Figure 2:
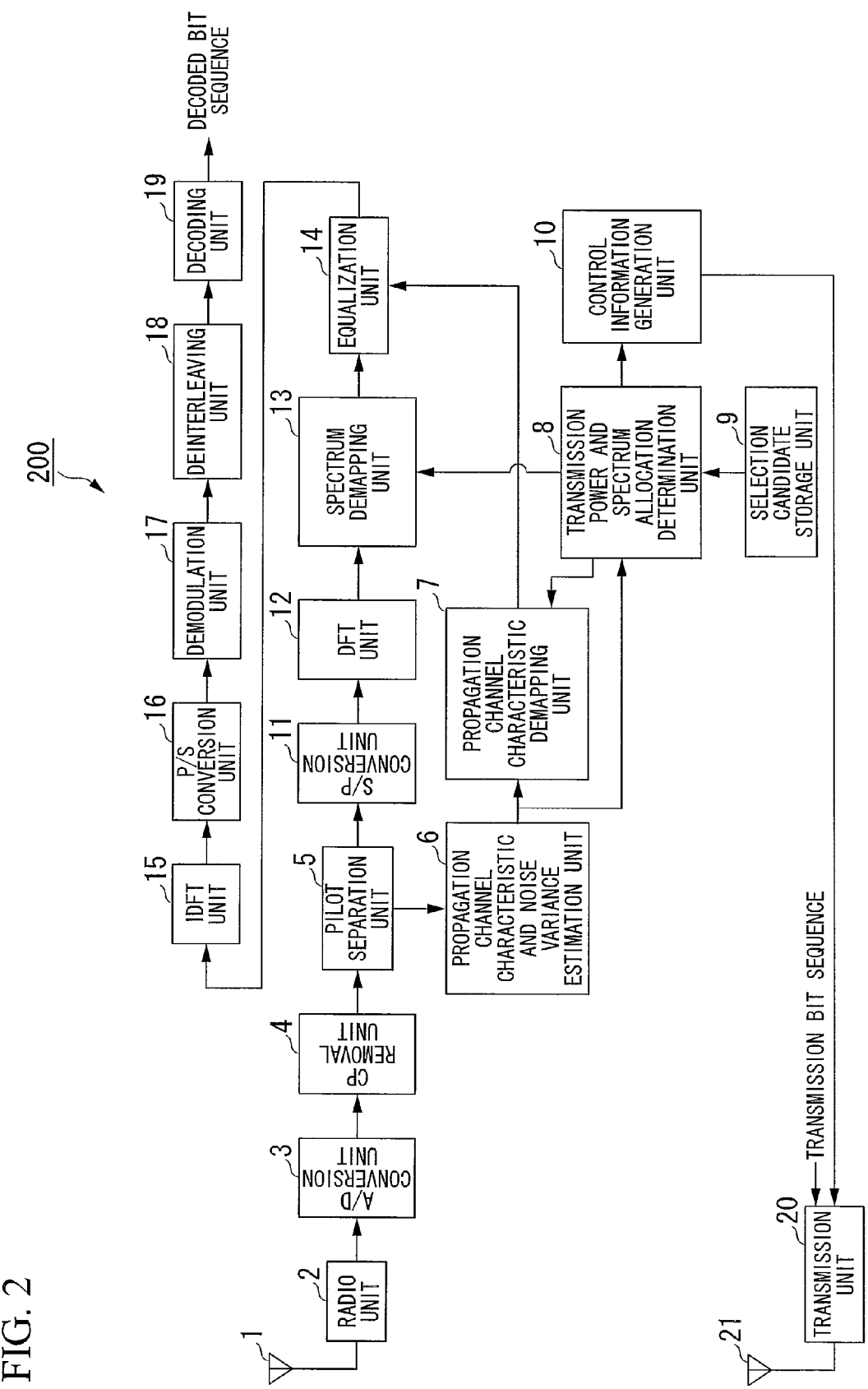
FIG. 2 is a schematic block diagram showing the configuration of a second communication device 200 according to the same embodiment.

FIG. 2 is a schematic block diagram showing the configuration of the second communication device 200 according to this embodiment. The second communication device 200 includes a reception antenna 1, a radio unit 2, an A/D conversion unit 3, a CP removal unit 4, a pilot separation unit 5, a propagation channel characteristic and noise variance estimation unit 6, a propagation channel characteristic demapping unit 7, a transmission power and spectrum allocation determination unit 8, a selection candidate storage unit 9, a control information generation unit 10, an S/P conversion unit 11, a DFT unit 12, a spectrum demapping unit 13, an equalization unit 14, an IDFT unit 15, a P/S conversion unit 16, a demodulation unit 17, a deinterleaving unit 18, a decoding unit 19, a transmission unit 20, and a transmission antenna 21.

The radio unit 2 receives a received signal from the first communication device via the reception antenna 1, and generates a baseband signal by down-converting the received signal. The A/D conversion unit 3 converts the baseband signal into a digital signal. Next, the CP removal unit 4 removes a CP from the digital signal. The pilot separation unit 1104 separates a pilot signal for estimating propagation channel characteristics and a data signal from the digital signal from which the CP is removed. The propagation channel estimation and noise variance estimation unit 6 calculates a frequency characteristic of a propagation channel and a variance of noise from the separated pilot signal. The propagation channel characteristic demapping unit 7 extracts only frequency characteristics related to subcarriers designated from the transmission power and spectrum allocation determination unit 8, that is, subcarriers actually used for transmission, from the calculated frequency characteristic of the propagation channel.

On the other hand, the S/P conversion unit 11 converts the data signal separated by the pilot separation unit 5 into parallel data signals. The DFT unit 12 generates frequency signals by performing a DFT on the parallel data signals. The spectrum demapping unit 13 forms the same spectrum sequence as that of the original transmission signal (an output signal of the DFT unit 35 in the first communication device 100) by extracting frequency signals of subcarriers designated from the transmission power and spectrum allocation determination unit 8, that is, subcarriers actually used for transmission, and returning the subcarriers to the original arrangement. The equalization unit 14 performs an equalization process of compensating for distortion by a propagation channel for the data signal returned based on the spectrum sequence by using frequency characteristics and variances of the subcarriers actually used for transmission and received from the propagation channel characteristic demapping unit 7.

In this embodiment, an example in which a minimum mean square error (MMSE) criterion type of equalization process is performed as the equalization process will be described.

The IDFT unit 15 converts the data signals equalized by the equalization unit 14 into signals on the time axis by an IDFT. The P/S conversion unit 16 converts the signals on the time axis into a serial signal. The demodulation unit 17 demodulates the serial signal on the time axis, and calculates likelihoods (reliabilities) of code bit units. The deinterleaving unit 18 returns the order of time of the likelihoods of the code bit units to the original by performing an inverse operation on the interleaving unit 32 in the first communication device 100. The decoding unit 19 generates a decoded bit sequence by performing a decoding process for the likelihoods of the code bit units of which the order of time is returned, and outputs the decoded bit sequence.

The transmission power and spectrum allocation determination unit (selection unit) 8 calculates a value indicating reception quality in the second communication device 200 when an arrangement in which a frequency signal is segmented in a segment size of a selection candidate and a reduction amount $\Delta P$ of average transmission power are used for each selection candidate as a combination of a predetermined segment size and a reduction amount $\Delta P$ of average transmission power. Here, segments are those into which a frequency signal is segmented in each segment size as a predetermined number. Frequency signals constituting the segments are arranged in continuous subcarriers. The reduction amount $\Delta P$ of average transmission power is a reduction amount $\Delta P$ to average transmission power when the first communication device 100 performs transmission in a largest segment size, that is, a segment size of highest average transmission power, among the selection candidates.

The transmission power and spectrum allocation determination unit 8 sets an arrangement of the frequency signal in subcarriers to be used upon calculation of the reception quality for each selection candidate as an arrangement in subcarriers having a best reception state among subcarriers in which the frequency signal is capable of being arranged among arrangements of the frequency signal in a segment size of the selection candidate. For a selection candidate, the selection candidate storage unit 9 stores a predetermined selection candidate.

The transmission power and spectrum allocation determination unit 8 selects a selection candidate to be used upon transmission by the first communication device among selection candidates based on values indicating the above-described reception qualities. In this embodiment, the transmission power and spectrum allocation determination unit 8 selects a selection candidate of the highest calculated reception quality as the selection candidate to be used upon transmission. Any one of selection candidates satisfying predetermined reception quality, not a selection candidate having the best reception quality, may be selected.

The selection candidate storage unit 9 stores a selection candidate, which is a combination of a predetermined segment size and a reduction amount $\Delta P$ of average transmission power, which is information indicating predetermined average transmission power to be described later. The control information generation unit 10 generates control information including spectrum allocation information indicating an arrangement used upon calculation of the reception quality of a selection candidate selected by the transmission power and spectrum allocation determination unit 9 and transmission power information indicating a reduction amount $\Delta P$ of average transmission power (average transmission power) of the selected selection candidate. The transmission unit (selection result transmission unit) 20 transmits the control information generated by the control information generation unit 10 and a transmission bit sequence, which is transmission data input from the outside, to the first transmission device 100 via the transmission antenna 21.

Figure 3:
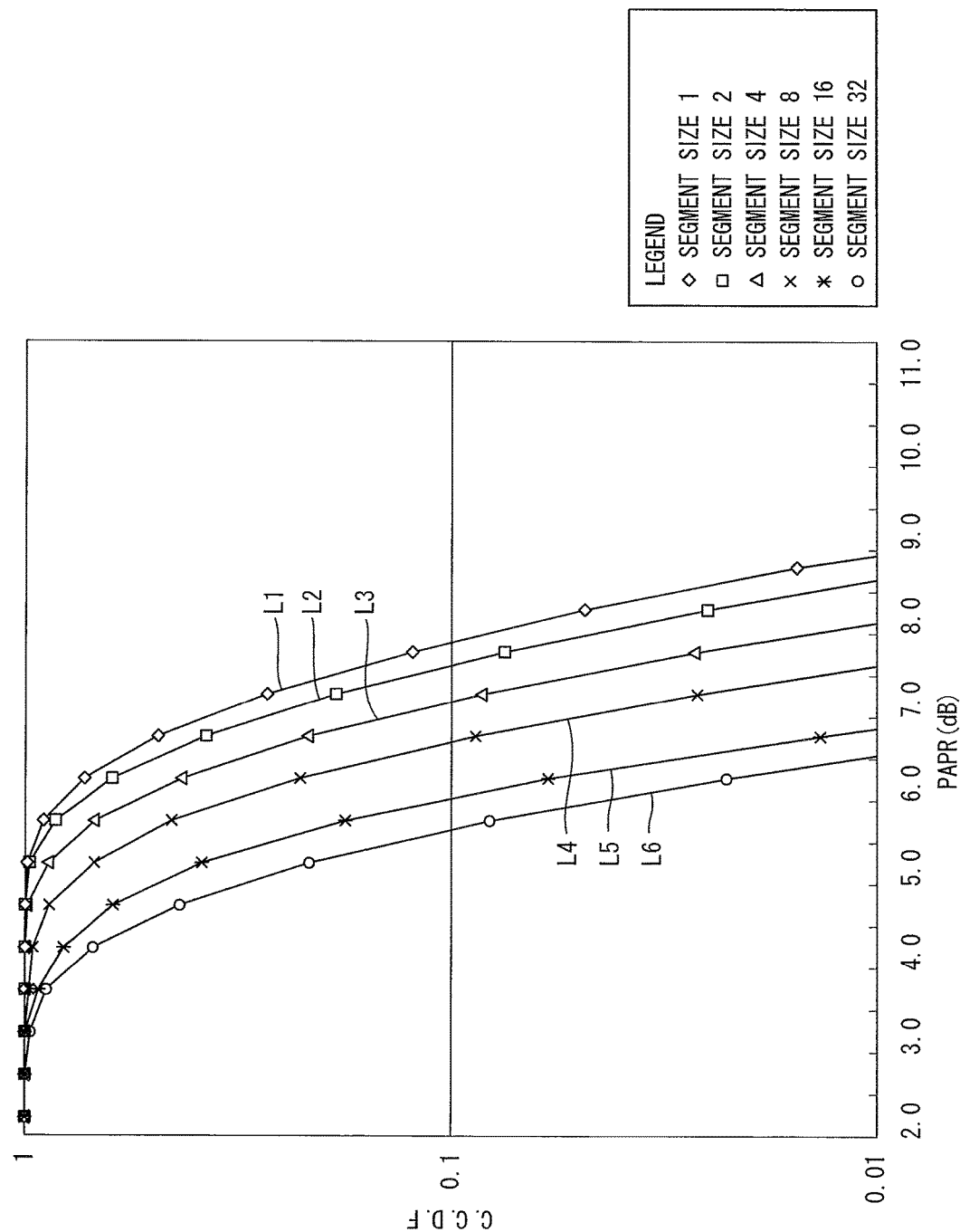
FIG. 3 is a diagram showing a complementary cumulative distribution function (CCDF) of PAPR according to the same embodiment.
Figure 4A:
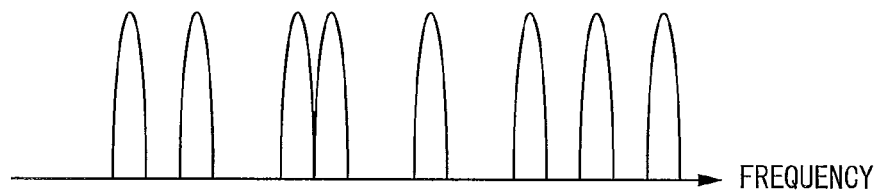
FIG. 4A is a diagram illustrating the concept of segmentation of a segment size 1 according to the same embodiment.
Figure 4B:
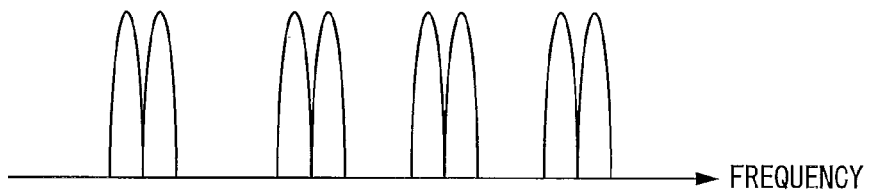
FIG. 4B is a diagram illustrating the concept of segmentation of a segment size 2 according to the same embodiment.
Figure 4C:
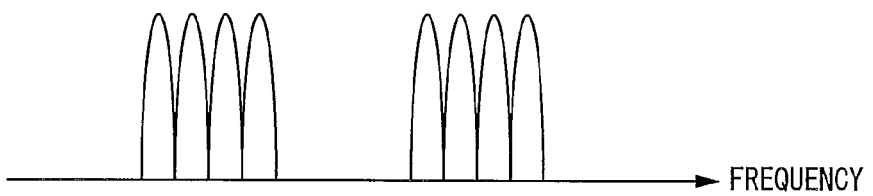
FIG. 4C is a diagram illustrating the concept of segmentation of a segment size 4 according to the same embodiment.
Figure 4D:
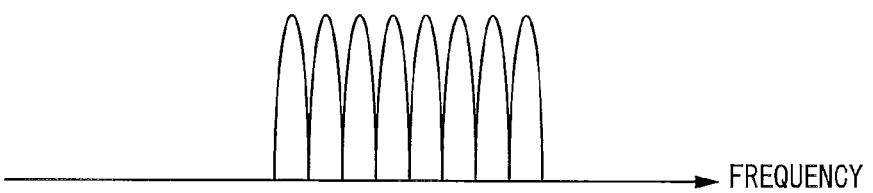
FIG. 4D is a diagram illustrating the concept of segmentation of a segment size 8 according to the same embodiment.

FIG. 3 is a diagram showing the CCDF of PAPR. In the same figure, the horizontal axis represents the PAPR. The vertical axis represents the CCDF, which is obtained by subtracting a cumulative distribution function (CDF) value from 1 and indicates a probability that the PAPR is greater than a value of the horizontal axis. That is, when characteristics are shown on the left in the same figure, it means that the PAPR is low and the PAPR characteristics are good. FIG. 3 shows the CCDF of PAPR when the number of used subcarriers is $N_u=32$ and the total number of subcarriers is $N_d=64$.

As shown in FIG. 3, a graph L1 shows CCDF characteristics in a segment size 1, a graph L2 shows CCDF characteristics in a segment size 2, a graph L3 shows CCDF characteristics in a segment size 4, a graph L4 shows CCDF characteristics in a segment size 8, a graph L5 shows CCDF characteristics in a segment size 16, and a graph L6 shows CCDF characteristics in a segment size 32. When the segment size is increased, it can be seen that the graph is close to the left and the PAPR characteristics are good.

FIGS. 4A, 4B, 4C, and 4D are diagrams illustrating the concept of segmentation. For simplification in the same figures, the cases where the number of used subcarriers is 8 and the segment size is 1, 2, 4, and 8 are shown in FIGS. 4A, 4B, 4C, and 4D. For example, for 2 segments generated by segmentation for every 4 subcarriers in the segment size 4 shown in FIG. 4C, only subcarriers within a segment are continuously arranged in a discrete frequency band having a good reception situation, and subcarriers are distributed and arranged in units of segments.

TABLE 1

| Segment Size | Reduction Amount ΔP of Transmission Power (dB) |
|---|---|
| 32 | 0.0 |
| 16 | 0.3 |
| 8 | 1.1 |
| 4 | 1.6 |
| 2 | 2.2 |
| 1 | 2.9 |

Table 1 shows an example of a combination of a segment size and a transmission power difference, which is a selection candidate stored by the selection candidate storage unit 9. Here, since the number of selection candidates is the number of possible segment sizes, it is unlikely to be a vast number. The selection candidate storage unit 9 stores all selection candidates and the transmission power and spectrum allocation determination unit 8 acquires information thereof from the selection candidate storage unit 9. The selection candidate shown in Table 1 is a combination of a segment size and a reduction amount ΔP of average transmission power, in which a probability that the peak power of transmission power upon signal transmission by the first communication device 100 does not exceed a predetermined threshold value is a predetermined value, determined based on PAPR characteristics shown in FIG. 3. Here, the predetermined threshold value is the limit power of a linear region of an amplifier (AMP) which amplifies a transmission signal to transmission power in the first communication device 100.

For example, when a probability that the above-described peak power does not exceed the threshold value is 99%, the reduction amount ΔP of transmission power as a value indicating that the peak power becomes uniform is stored in association with each segment size if the CCDF of PAPR which is 0.01, that is, the PAPR occurring at a probability of 99%, is considered and power is reduced to a certain extent in other segment sizes with respect to transmission power based on the segment size 32. That is, it is indicated that the average transmission power is reduced by "0.3 dB" in the segment size "16" as compared with the segment size "32," and the average transmission power is reduced by "1.1 dB" in the segment size "8" as compared with that of the segment size "32." The example shown in Table 1 is the reduction amount ΔP of average transmission power to a segment size when the number of used subcarriers is $N_u=32$. The same table is calculated using CCDF=0.01 of FIG. 3, that is, a PAPR of 99%.

Figure 5:
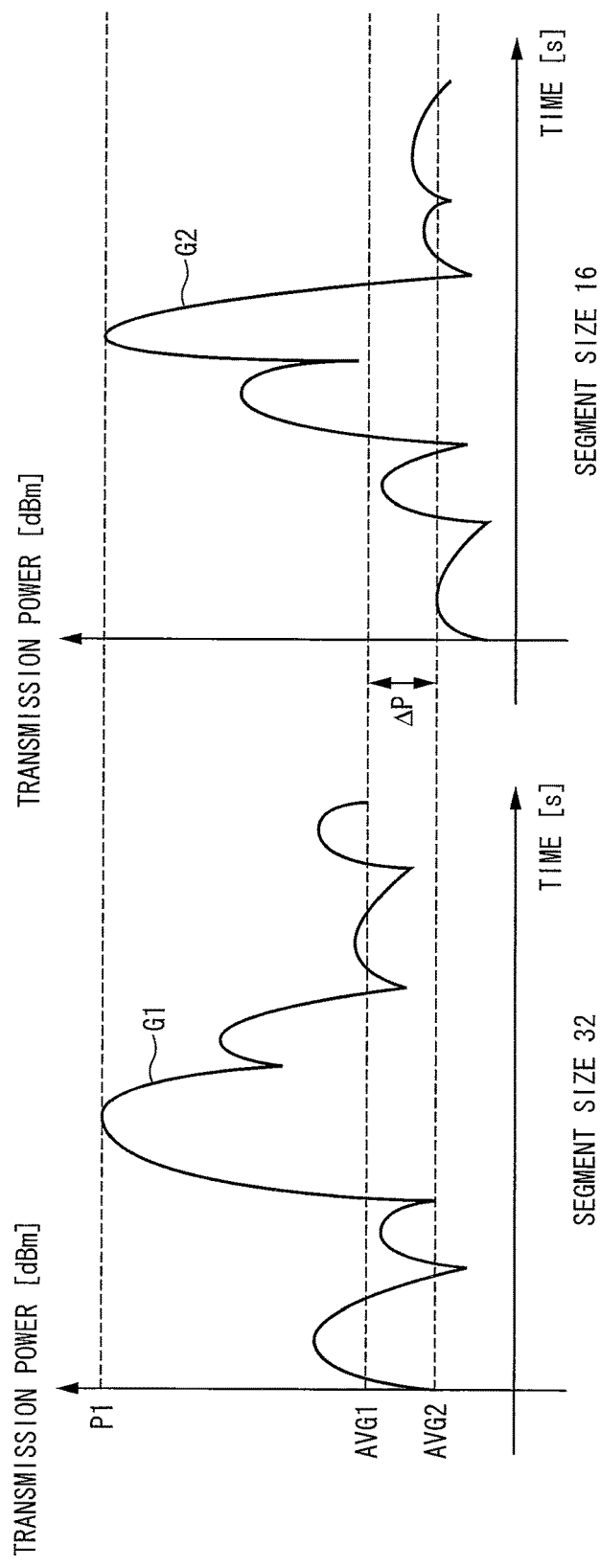
FIG. 5 is a diagram illustrating a relationship between a segment size and a reduction amount $\Delta P$ of average transmission power of Table 1 according to the same embodiment.

FIG. 5 is a diagram illustrating a relationship between a segment size and a reduction amount ΔP of average transmission power of Table 1. In two graphs shown in FIG. 5, the horizontal axis represents the time [s], and the vertical axis represents the transmission power [dBm]. The left graph G1 is a graph when the segment size is 32 and the average transmission power is AVG1, and the right graph G2 is a graph when the segment size is 16 and the average transmission power is AVG2. Peak power P1 is a predetermined threshold value and is the limit power of a linear region of an amplifier, which amplifies a transmission signal to transmission power in the first communication device 100.

Since peak points of the left graph G1 and the right graph G2 become the peak power P1 as shown in FIG. 5, the average transmission power AVG1 is an average transmission power value, which becomes the peak power P1 in the segment size 32, and the average transmission power AVG2 is an average transmission power value, which becomes the peak power P1 in the segment size 16. The reduction amount ΔP "0.3" of transmission power associated with the segment size "16" in Table 1 is ΔP shown in FIG. 5, that is, a reduction amount ΔP from the average transmission power AVG1 to the average transmission power AVG2.

An example in which the selection candidate storage unit 9 associates and stores a segment size and a reduction amount ΔP of average transmission power in this embodiment has been described, but it is preferable that a value stored in association with a segment size be a value indicating average transmission power for preventing the peak power from exceeding the predetermined threshold value. The stored value may be a value of average transmission power itself, an amplification rate of an amplifier for a signal of average transmission power, or a reduction amount (difference) or ratio of the amplification rate.

An example in which a PAPR is used as an index indicating the peak power of transmission power has been described in this embodiment, but another index indicating the peak power such as cubic metric (CM) may be used.

Next, a determination method for segment size determination and spectrum allocation by the transmission power and spectrum allocation determination unit 8 will be described. First, for each segment size, a frequency having a good reception situation is selected in a segment unit of the segment size and allocation is temporarily selected.

Next, reception quality Q after equalization shown in Equation (1) is calculated for temporary allocation of each segment size.

$$Q = 10\log_{10}\frac{\mu}{1-\mu} - \Delta P \quad (1)$$

In Equation (1), the reception quality Q is a ratio of a received signal and noise after an MMSE type of frequency domain equalization process considering a reduction amount of transmission power, and ΔP is a reduction amount of transmission power for each segment size set in Table 1. μ is a value expressed by Equation (2) using a frequency characteristic of a propagation channel and a variance of noise at a temporarily selected discrete frequency.

$$\mu = \frac{1}{N_U} \sum_{k=1}^{N_u} \left( \Xi^*(k)(\Xi(k)\Xi^*(k) + \sigma^2)^{-1} \Xi(k) \right) \quad (2)$$

Here, $\Xi(k)$ is a propagation channel gain (complex number) of a frequency (subcarrier) to which a k-th frequency signal is allocated before mapping by the spectrum mapping unit 36 (FIG. 1) of the first communication device 100, and $\sigma^2$ is a variance value (real number) of noise estimated by the propagation channel characteristic and noise variance estimation unit 6. This may be replaced with a reciprocal of the ratio of a received signal and noise. For example, if a second frequency signal before mapping is mapped to a fifth subcarrier in terms of propagation channel characteristics, $\Xi(2)$ indicates a gain of a fifth propagation channel (subcarrier) of assignable propagation channels.

Reception qualities Q are calculated in all segment sizes by Equations (1) and (2), a combination of a segment size having a largest reception quality (Q) value and spectrum allocation is set as spectrum allocation information at the next transmission opportunity, and a reduction amount ΔP of transmission power stored by the selection candidate storage unit 9 associated with the segment size is set as transmission power information.

Since the selection candidate storage unit 9 stores combinations of segment sizes and information indicating average power in advance as selection candidates so that they do not exceed the linear region of the amplifier in the first communication device 100 as described above, and the transmission power and spectrum allocation determination unit 8 selects a selection candidate for which the reception quality Q is high from among the selection candidates, it is possible to optimize an increase of transmission power due to the improvement effect of PAPR characteristics by increasing the segment size and a trade-off of an improvement amount of transmission characteristics by reducing the segment size, thereby obtaining excellent transmission efficiency.

In this embodiment as described above, an example in which the equalization unit 14 (FIG. 2) in the second communication device 200 performs an MMSE criterion type of equalization process and the transmission power and spectrum allocation determination unit 8 calculates the reception quality Q using Equation (1) based on the MMSE criterion type of equalization process has been described. However, the reception quality Q may be obtained using the following Equation (3) in the second communication device 200 in which the equalization unit 14 performs equalization by iteration represented by a turbo coding technique.

$$\mu = \frac{1}{\sigma^2 N_u} \sum_{k=1}^{N_u} \Xi(k)\Xi^*(k) \quad (3)$$

Figure 6:
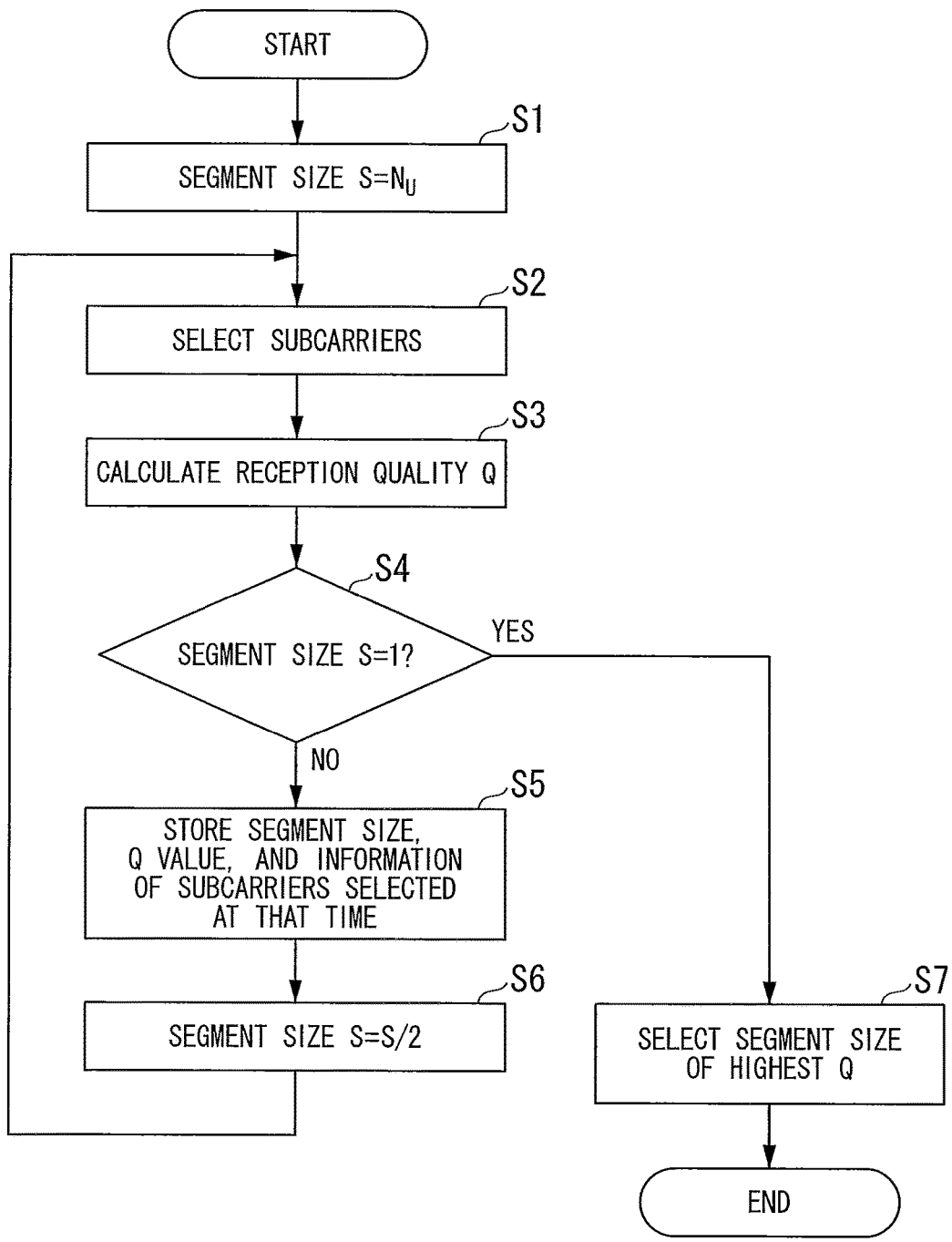
FIG. 6 is a flowchart illustrating the operation of a transmission power and spectrum allocation determination unit 8 according to the same embodiment.

FIG. 6 is a flowchart illustrating the operation of the transmission power and spectrum allocation determination unit 8 according to this embodiment. First, the transmission power and spectrum allocation determination unit 8 sets the number of used subcarriers, $N_u$, as an initial value to a segment size in step S1, and temporarily performs spectrum allocation to arrange a frequency signal in subcarriers having a best propagation channel gain under a limit of the segment size in step S2. Next, in step S3, the transmission power and spectrum allocation determination unit 8 calculates the reception quality Q in the spectrum allocation temporarily performed in step S2 based on Equation (1). Next, in step S4, the transmission power and spectrum allocation determination unit 8 determines whether or not the segment size is 1. When it is determined that the segment size is not 1, a current segment size, spectrum allocation information, and a reception quality (Q) value are stored in step S5. Next, the transmission power and spectrum allocation determination unit 8 reduces the segment size by half in step S6, returns to step S2, and iterates the above until the segment size is determined to be 1 in step S4.

On the other hand, when the segment size is determined to be 1 in step S4, the transmission power and spectrum allocation determination unit 8 performs the comparison with the reception quality (Q) value stored in step S5 including a reception quality (Q) value of the segment size 1, outputs a segment size of a largest reception quality (Q) value, transmission power corresponding thereto, and spectrum allocation to the control information generation unit 10, and terminates the process.

Here, the second communication device 200 determines a segment size, transmission power, and spectrum allocation, but the first communication device 100 may make a determination since the same is essentially true even when the first communication device 100 has the selection candidate storage unit 9 and determines the allocation if information of propagation channel characteristics is fed back. An example of applying the MMSE criterion type of frequency domain equalization has been described in this embodiment, but the reception quality may be calculated in other frequency domain equalization such as zero forcing (ZF) and the like. For example, in the case of ZF, the reception quality Q indicated by Equation (1) is calculated using the following Equation (4).

$$Q = 10\log_{10} \frac{1}{\frac{\sigma^2}{K} \sum_{k=1}^{K} \left( \frac{1}{|\Xi(k)|^2} + 1 \right)} - \Delta P \quad (4)$$

Here, K is the number of signals included in a DFT block, $\sigma^2$ is a variance of thermal noise, and $\Xi(k)$ is a propagation channel gain expressed by a complex number at a k-th frequency.

Second Embodiment

A mobile communication system as a wireless communication system according to the second embodiment of the present invention will now be described with reference to the drawings. The number of first communication devices 100 (hereinafter, referred to as the number of users) is 1 in the first embodiment. However, a mobile communication system in which a plurality of users, that is, a plurality of first communication devices 100 as mobile station devices, exist and communicate with a second communication device 200*a* as a base station device will be described in this embodiment. The mobile communication system of this embodiment is a cellular system.

The second communication device 200*a* performs subcarrier allocation in order from a first communication device 100 (of large attenuation) farther away from the second communication device 200*a*. In the first embodiment, spectrum allocation may be determined by any of the first communication device 100 and the second communication device 200. However, in this embodiment, the second communication device 200*a* determines spectrum allocation to all of the first communication devices 100 since the second communication device 200*a* as the base station controls the spectrum allocation in a multiuser case. The second communication device 200*a* may transmit information regarding propagation channel characteristics of all of the first communication devices 100 to the first communication devices 100 in place of transmitting spectrum allocation information so that all of the first communication devices 100 perform the spectrum allocation under the same rule. Accordingly, the first communication devices 100 may perform the spectrum allocation.

Figure 7:
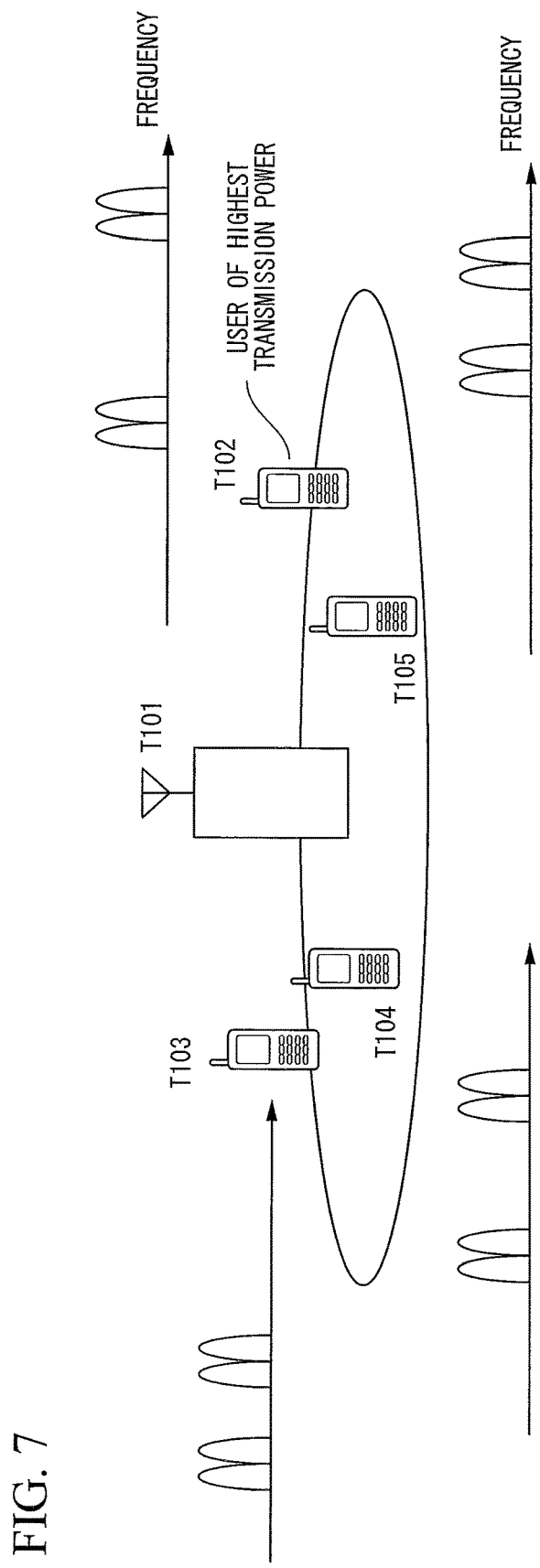
FIG. 7 is a conceptual diagram showing an example of a state of a mobile communication system when the number of users is "4" and a segment size is "2" according to a second embodiment of the present invention.

FIG. 7 is a conceptual diagram showing an example of a state of the mobile communication system when the number of users is "4" and the segment size is "2" in this embodiment. In the same figure, T101 denotes the second communication device 200*a* as the base station and T102 to T105 denote the first communication devices 100 as the mobile stations, which simultaneously transmit signals. In this case, signals transmitted by the first communication devices 100 are spatially multiplexed so that the signals are arranged by the spectrum allocation of the second communication device 200*a* without overlapping on the frequency axis. The second communication device 200*a* first determines the segment size and the spectrum allocation for the first communication device 100 of T102 having highest transmission power. Subsequently, spectrum allocation is sequentially determined in descending order of transmission power. This is because a subcarrier having a good transmission characteristic can be selected as a segment size is smaller, and the peak power is lower than that of the user having the highest transmission power if the transmission power is low even in the same segment size, that is, the same PAPR, as that of a user having the highest transmission power.

Figure 8:
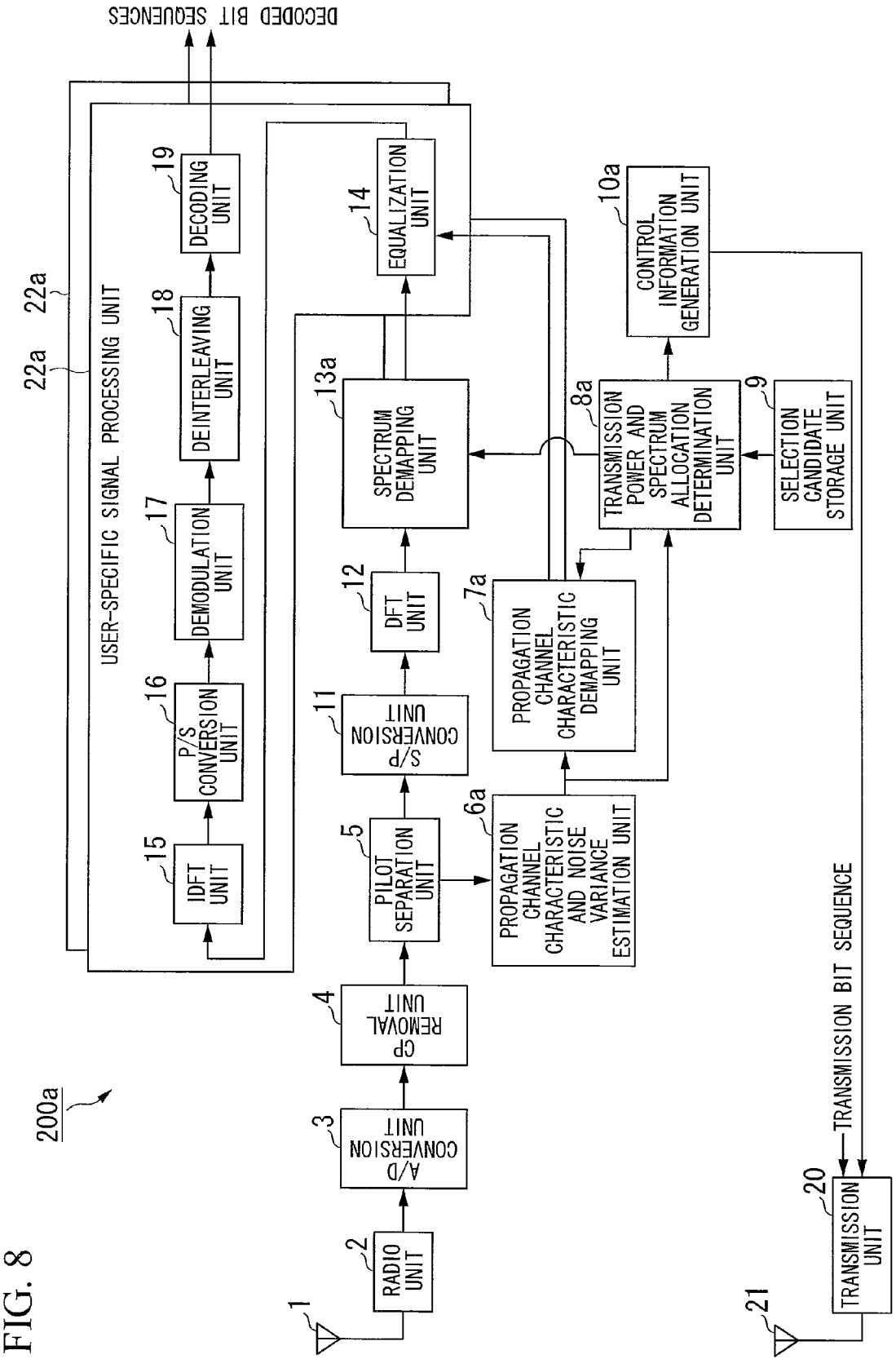
FIG. 8 is a schematic block diagram showing the configuration of a second communication device 200a according to the same embodiment.

FIG. 8 is a schematic block diagram showing the configuration of the second communication device 200*a* in this embodiment. The second communication device 200*a* includes a reception antenna 1, a radio unit 2, an A/D conversion unit 3, a CP removal unit 4, a pilot separation unit 5, a propagation channel characteristic and noise variance estimation unit 6*a*, a propagation channel characteristic demapping unit 7*a*, a transmission power and spectrum allocation determination unit 8*a*, a selection candidate storage unit 9, a control information generation unit 10*a*, an S/P conversion unit 11, a DFT unit 12, a spectrum demapping unit 13*a*, a plurality of user-specific signal processing units 22*a*, a transmission unit 20, and the transmission antenna 21. The user-specific signal processing unit 22*a* includes an equalization unit 14, an IDFT unit 15, a P/S conversion unit 16, a demodulation unit 17, a deinterleaving unit 18, and a decoding unit 19.

The same reference symbols 1 to 5, 9, 11, 12, and 14 to 21 are assigned to parts of FIG. 8 corresponding to those of FIG. 2, and description thereof is omitted. The propagation channel characteristic and noise variance estimation unit (measurement unit) 6*a* calculates frequency characteristics of propagation channels and variances of noise for all of the first communication devices 100 based on pilot signals separated by the pilot separation unit 5 from signals transmitted from the first communication devices 100, and calculates attenuation amounts for frequency characteristics or distance attenuations of the propagation channels for all of the first communication devices 100. The propagation channel characteristic demapping unit 7*a* extracts only a frequency characteristic of a propagation channel related to subcarriers designated from each of the first communication devices 100, that is, subcarriers actually used for transmission, from the calculated frequency characteristics of the propagation channels. The propagation channel characteristic demapping unit 7*a* outputs the extracted frequency characteristic of the propagation channel for each of the first communication devices 100 to the equalization unit 14 in the user-specific signal processing unit 22*a* responsible for signal processing corresponding to the first communication device 100 among the user-specific signal processing units 22*a*.

The spectrum demapping unit 13*a* forms the same spectrum sequence as that of the original transmission signal by extracting the frequency signal of subcarriers designated from the transmission power and spectrum allocation determination unit 8*a* for each of the first communication devices 100, that is, subcarriers actually used for transmission, and returning the subcarriers to the original arrangement. The spectrum demapping unit 13*a* outputs a frequency signal of each of the first communication devices 100 by forming the same spectrum sequence as that of the original transmission signal to the equalization unit 14 in the user-specific signal processing unit 22*a* responsible for signal processing corresponding to the first communication device 100. Each of the user-specific signal processing units 22*a* receives a frequency signal of the first communication device 100 and a frequency characteristic of a propagation channel for which the user-specific signal processing unit 22*a* is responsible from the spectrum demapping unit 13*a* and the propagation channel characteristic demapping unit 7*a*, performs an equalization process, an inverse Fourier transform process, a P/S conversion process, a demodulation process, a deinterleaving process, and a decoding process on the frequency signal based on the frequency characteristic of the propagation channel, and outputs a decoded bit sequence to the outside.

The transmission power and spectrum allocation determination unit 8*a* (selection unit) determines transmission power of each of the first communication devices 100 based on the calculated attenuation amounts and sorts the first communication devices 100 in descending order of transmission power so that average transmission power of the first communication device 100 of a largest attenuation amount received from the propagation channel characteristic and noise variance estimation unit 6*a* becomes a predetermined maximum transmission power of the first communication devices 100 and reception power in the second communication device 200*a* is uniform for all of the first communication devices 100.

At this time, a method of estimating frequency characteristics and distance attenuations of propagation channels may be the same as described above with reference to the propagation channel characteristic and noise variance estimation unit 6*a*. For example, a method may be used which measures a gain in a frequency characteristic of a propagation channel from a pilot signal for propagation channel estimation and calculates distance attenuation from reception power of a signal from the first communication device 100 to the second communication device 200a as used in a cellular system of the related art.

Next, the transmission power and spectrum allocation determination unit 8a determines a segment size and spectrum allocation for a first communication device 100 of the highest transmission power by the same technique as that of the transmission power and spectrum allocation determination unit 8 according to the first embodiment. Next, the transmission power and spectrum allocation determination unit 8a selects a first communication device 100 having the second highest transmission power, excludes subcarriers (discrete frequencies) used by first communication devices 100 for which spectrum allocation has already been performed from selectable subcarriers, and performs spectrum allocation in the same segment size as that of the first communication device 100 for which the spectrum allocation has been first set from the selectable subcarriers.

In the same way, the transmission power and spectrum allocation determination unit 8a performs spectrum allocation in order from a first communication device 100 having high transmission power. At this time, if the same segment size as that of the first communication device 100 of the highest transmission power may not be used, spectrum allocation may be performed by reducing the segment size. If the segment size is not reduced, an empty discrete frequency band which is less than or equal to that of the segment size may be prevented from being generated by providing a limit to generate a subchannel from an assignable discrete frequency band for each first set segment size and allocate each segment to the subchannel. The control information generation unit 10a generates a signal in which spectrum allocation information is reported for each of the first communication devices 100 selected as described above, and reports the generated signal to the first communication device 100 by the transmission unit 20.

Figure 9:
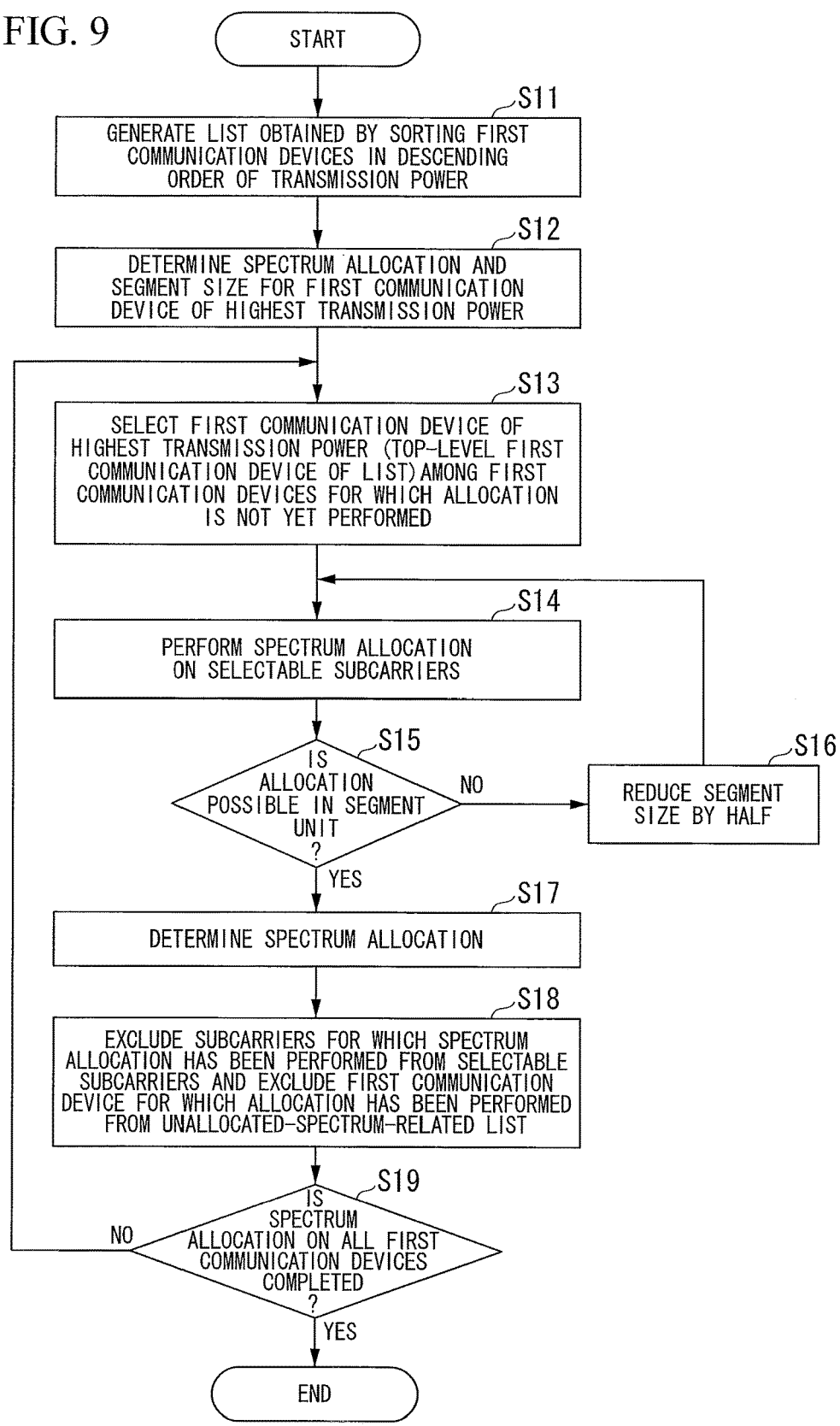
FIG. 9 is a flowchart illustrating the operation of a spectrum allocation process of a transmission power and spectrum allocation determination unit 8a according to the same embodiment.

FIG. 9 is a flowchart illustrating the operation of a spectrum allocation process of the transmission power and allocation determination unit 8a according to this embodiment. First, in step S11, the transmission power and spectrum allocation determination unit 8a calculates attenuation amounts for the respective first communication devices 100 from the estimated propagation channel characteristics or distance attenuations, and generates a list of first communication devices 100 sorted in descending order of average transmission powers defined according to the attenuation amounts. Next, in step S12, the transmission power and spectrum allocation determination unit 8a determines a segment size (and a reduction amount of transmission power) and spectrum allocation for a first communication device 100 having highest average transmission power among first communication devices 100 to which a spectrum is not yet allocated. The segment size and the spectrum allocation in step S12 are determined by the same process as that of steps S1 to S7 of FIG. 6 according to the first embodiment. The transmission power and spectrum allocation determination unit 8a excludes the first communication device 100 for which the spectrum allocation has been determined from the list generated in step S11.

Next, in step S13, the transmission power and spectrum allocation determination unit 8a selects a top-level first communication device 100 of the above-described list, that is, a first communication device 100 having highest transmission power among first communication devices 100 to which a spectrum is not yet allocated. Next, in step S14, the transmission power and spectrum allocation determination unit 8a performs allocation in which the best reception quality Q is obtainable from assignable discrete frequencies in a current segment size on the first communication device 100 selected in step S13. Next, in step S15, the transmission power and spectrum allocation determination unit 8a determines whether or not spectrum allocation is normally performed in a segment unit in step S14.

When it is determined that the spectrum allocation is not normally performed in step S15, the transmission power and spectrum allocation determination unit 8a makes the transition to step S16, returns to step S14 by reducing the segment size by half, and performs spectrum allocation in the segment size reduced by half in step S16 on the first communication device 100 selected in step S13.

On the other hand, when it is determined that spectrum allocation is normally performed in step S15, the transmission power and spectrum allocation determination unit 8a determines the spectrum allocation of a processing result of step S14 by making the transition to step S17. Next, in step S18, the transmission power and spectrum allocation determination unit 8a excludes a discrete frequency for which spectrum allocation has been performed from selectable discrete frequencies, and excludes a first communication device 100 for which spectrum allocation has been performed from an unallocated-spectrum-related list. Thereafter, in step S19, the transmission power and spectrum allocation determination unit 8a determines whether or not any first communication device 100 to which a spectrum is not yet allocated in the list remains. When it is determined that a first communication device 100 to which a spectrum is not yet allocated remains in step S19, the transmission power and spectrum allocation determination unit 8a iterates a subsequent process by making the transition to step S14. On the other hand, when it is determined that no first communication device 100 to which a spectrum is not yet allocated remains in step S19, that is, when spectrum allocation to all of the first communication devices 100 is completed, a spectrum allocation process is terminated.

As described above, the transmission power and spectrum allocation determination unit 8a determines average transmission power, a segment size, and spectrum allocation for a first communication device 100 of a largest attenuation amount, which performs transmission at highest average transmission power, among a plurality of first communication devices 100 as in the first embodiment, and determines a segment size and spectrum allocation for the other first communication devices 100 so that average transmission power is set in response to the attenuation amount and also the segment size is the same or is reduced. Accordingly, excellent transmission efficiency can be obtained even in a wireless communication system having a plurality of first communication devices 100 as in the first embodiment.

Third Embodiment

A mobile communication system which is a wireless communication system according to the third embodiment of the present invention will now be described with reference to the drawings. The wireless communication system according to the third embodiment is a mobile communication system having first communication devices 100 as a plurality of mobile station devices and a second communication device 200b as a base station device. The wireless communication system of this embodiment is the same as that of the second embodiment in that a segment size is determined from a first communication device 100 having highest average transmission power, but is different from that of the second embodiment in that a transmission power and spectrum allocation determination unit 8b generates a subchannel from a frequency band in which spectrum allocation is possible, and arranges a segment in the subchannel.

Figure 10:
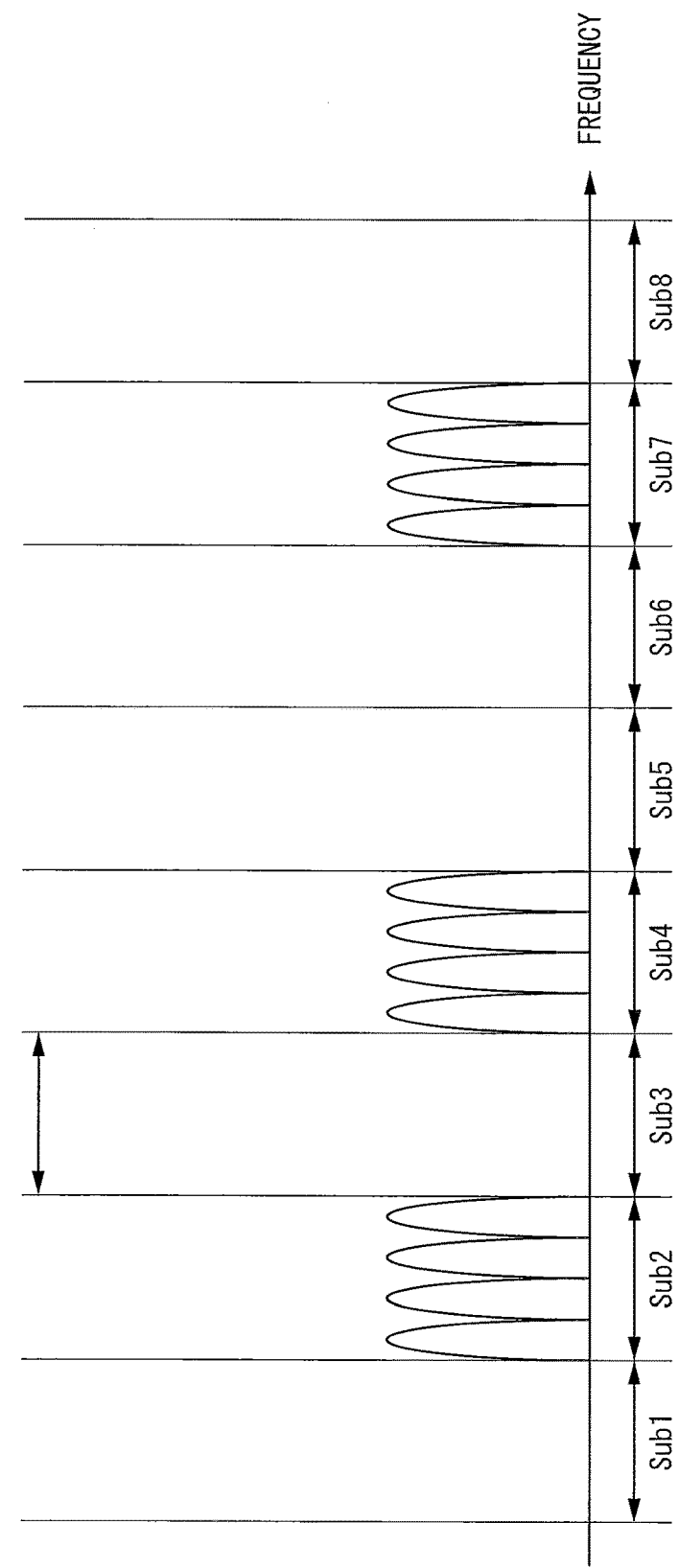
FIG. 10 is a diagram illustrating the concept of subchannels in a wireless communication system according to a third embodiment of the present invention.

FIG. 10 is a diagram illustrating a concept of subchannels in the wireless communication system of this embodiment. The same figure shows a concept of subchannels when 4 subcarriers are set as one segment. As shown in the same figure, segmented subcarriers Sub2, Sub4, and Sub7 are arranged in subchannels Sub1 to Sub8 into which the entire assignable band is divided for every segment size (4 subcarriers). This process is performed in all segment sizes segmented, and a segment size and spectrum allocation of highest reception quality Q are selected.

Figure 11:
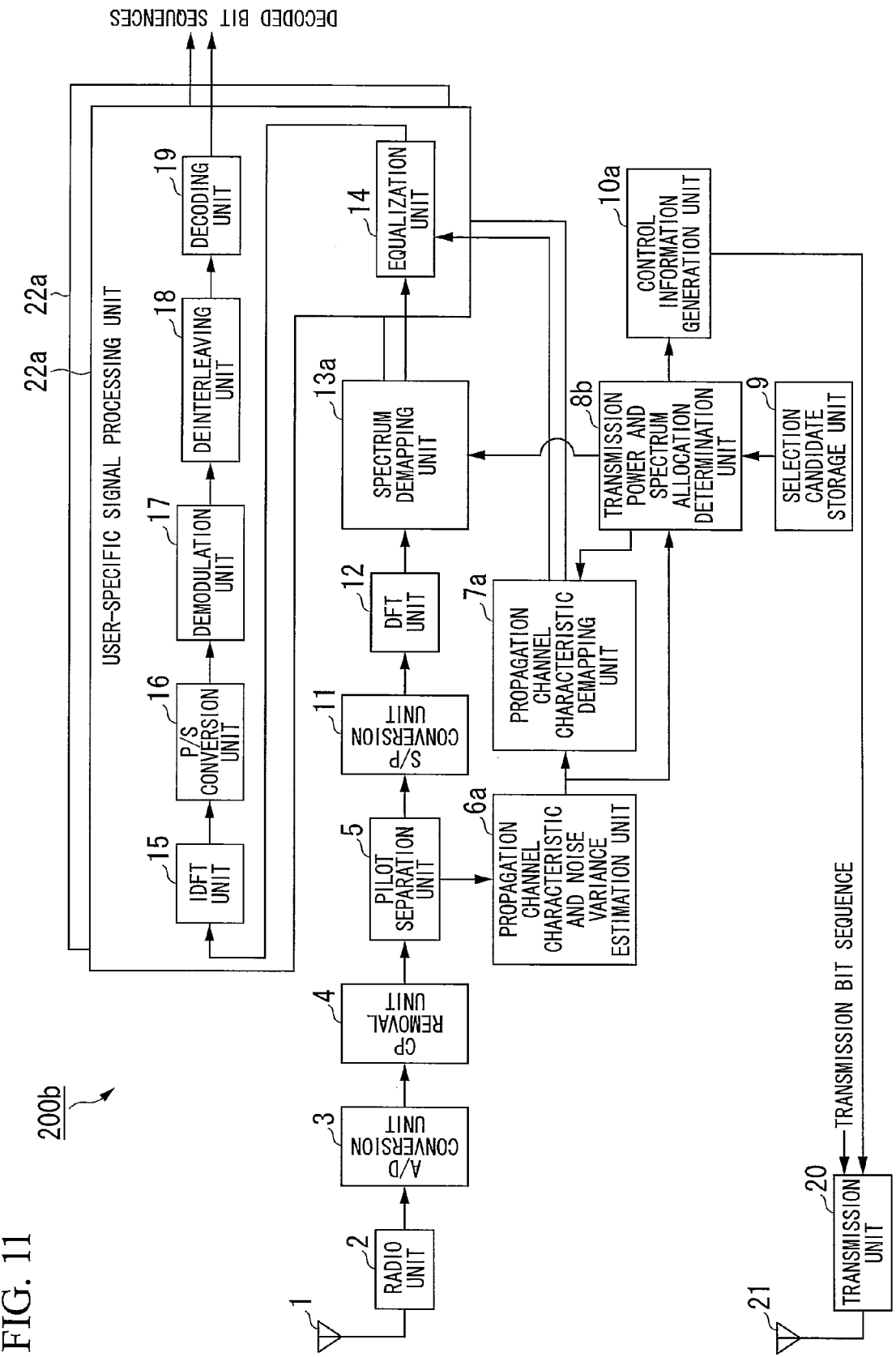
FIG. 11 is a schematic block diagram showing the configuration of a second communication device 200b according to the same embodiment.

FIG. 11 is a schematic block diagram showing the configuration of the second communication device 200b according to this embodiment. The second communication device 200b includes a reception antenna 1, a radio unit 2, an A/D conversion unit 3, a CP removal unit 4, a pilot separation unit 5, a propagation channel characteristic and noise variance estimation unit 6a, a propagation channel characteristic demapping unit 7a, the transmission power and spectrum allocation determination unit 8b, a selection candidate storage unit 9, a control information generation unit 10a, an S/P conversion unit 11, a DFT unit 12, a spectrum demapping unit 13a, a plurality of user-specific signal processing units 22a, a transmission unit 20, and a transmission antenna 21. The user-specific signal processing unit 22a includes an equalization unit 14, an IDFT unit 15, a P/S conversion unit 16, a demodulation unit 17, a deinterleaving unit 18, and a decoding unit 19. The same reference symbols 1 to 5, 6a, 7a, 9, 10a, 11, 12, 13a, 14 to 21, and 22a are assigned to parts of FIG. 11 corresponding to those of FIG. 8, and description thereof is omitted.

The transmission power and spectrum allocation determination unit 8b is different from the transmission power and spectrum allocation determination unit 8a (FIG. 8) of the second embodiment only in that subchannels into which the entire assignable frequency band is divided for every segment size are set as units, and segmented subcarriers are arranged in the subchannels, when spectrum allocation is performed on each of the first communication devices 100. Here, a used segment size is a segment size determined for a first communication device 100 having highest average transmission power.

Figure 12:
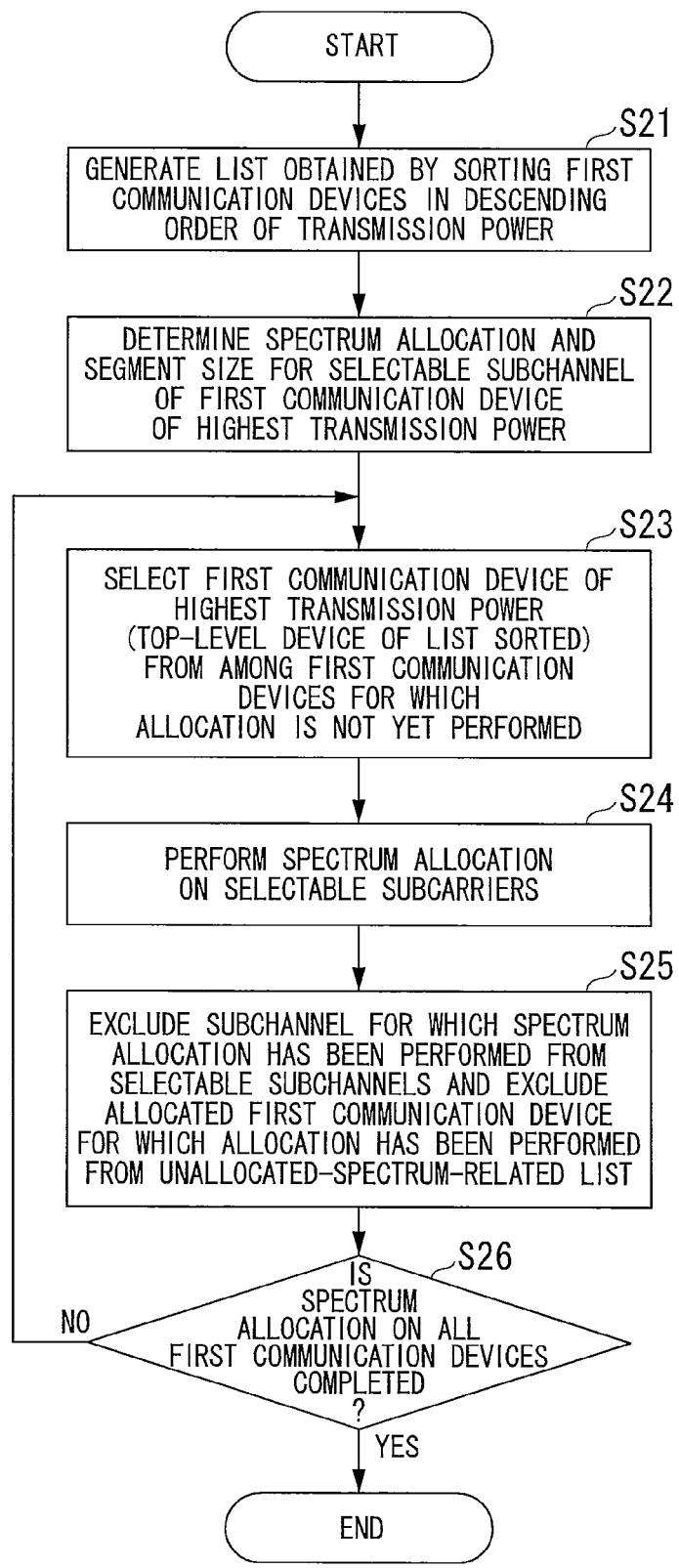
FIG. 12 is a flowchart illustrating the operation of a spectrum allocation process of a transmission power and spectrum allocation determination unit 8b according to the same embodiment.

FIG. 12 is a flowchart illustrating the operation of a spectrum allocation process of the transmission power and spectrum allocation determination unit 8b according to this embodiment. A difference from the transmission power and spectrum allocation determination unit 8a according to the second embodiment is that a segment arrangement position is changed from a subcarrier unit to a subchannel unit upon spectrum allocation in which a segment is allocated to subcarriers and the step of reducing a segment size is absent.

First, in step S21, the transmission power and spectrum allocation determination unit 8b calculates attenuation amounts for the respective first communication devices 100 from estimated propagation channel characteristics or distance attenuations, and generates an unallocated-spectrum-related list by sorting first communication devices 100 in descending order of average transmission powers defined according to the attenuation amounts. Next, in step S22, the transmission power and spectrum allocation determination unit 8b determines a segment size (and a reduction amount of transmission power) and spectrum allocation for a top-level first communication device 100 of the unallocated-spectrum-related list, that is, a first communication device 100 having highest average transmission power. The segment size and the spectrum allocation in step S22 are determined by the same process as that of steps S1 to S7 of FIG. 6 according to the first embodiment. However, in step S22 of this embodiment, unlike steps S1 to S7, a segment arrangement position is limited to a subcarrier unit upon spectrum allocation. The transmission power and spectrum allocation determination unit 8b excludes a subchannel in which a segment has been arranged, that is, a selected subchannel, from selectable subchannels, and also excludes the first communication device 100 for which spectrum allocation has been determined from the unallocated-spectrum-related list generated in step S21.

Next, in step S23, the transmission power and spectrum allocation determination unit 8b selects the above-described top-level first communication device 100 of the unallocated-spectrum-related list, that is, the first communication device 100 having the highest average transmission power among the first communication devices 100 to which a spectrum is not yet allocated. Next, in step S24, the transmission power and spectrum allocation determination unit 8b performs spectrum allocation on a subchannel from which the best reception quality Q is obtainable among the selectable subchannels on the first communication device 100 selected in step S23 by using the spectrum size determined in step S22.

Next, in step S25, the transmission power and spectrum allocation determination unit 8b excludes the top-level first communication device 100, that is, the first communication device 100 for which the spectrum allocation has been performed in step S24, from the unallocated-spectrum-related list generated in step S21, and also excludes the selected subchannel from the selectable subchannels. Next, in step S26, the transmission power and spectrum allocation determination unit 8b determines whether or not spectrum allocation for all of the first communication devices 100 is completed by whether or not any first communication device 100 remains in the unallocated-spectrum-related list. When it is determined that the spectrum allocation is not completed, that is, that a first communication device 100 remains in the unallocated-spectrum-related list, the transmission power and spectrum allocation determination unit 8b iterates a subsequent process by returning to step S23. On the other hand, when it is determined that allocation to all of the first communication devices 100 is completed, that is, that no first communication device 100 remains in the unallocated-spectrum-related list, in step S26, the spectrum allocation process is terminated.

Since spectrum allocation (scheduling) is performed in the same segment size for all of the first communication devices 100 in this embodiment, subcarriers may be sequentially allocated to the first communication devices 100 in a subchannel unit from the point of view of scheduling fairness. For example, the same is essentially true even when the subcarriers corresponding to the number of used subcarriers, $N_u=16$, are allocated by iterating a process of sequentially allocating 1 subchannel to each first communication device 100 four times as a result of dividing the number of used subcarriers, $N_u$, by the segment size S if the number of used subcarriers is $N_u=16$ and the segment size is S=4.

Since subchannels into which the entire assignable frequency band is divided for every segment size are set as units, and segmented subcarriers are arranged in the subchannels when the transmission power and spectrum allocation determination unit 8b performs spectrum allocation on each first communication device 100 as described above, the second communication device 200b can prevent an allocation process from being complicated when the number of unallocated subcarriers is smaller than a segment size and can suppress a processing amount while obtaining excellent transmission efficiency.

Fourth Embodiment

A mobile communication system which is a wireless communication system according to the fourth embodiment of the present invention will now be described with reference to the drawings. The wireless communication system according to this embodiment is a mobile communication system having first communication devices 100 as a plurality of mobile station devices and a second communication device 200c as a base station device.

A technique of determining a segment size for each first communication device 100 will be described as the fourth embodiment. In this technique, the subchannel concept described in the third embodiment is introduced when spectrum allocation for each first communication device 100 is performed, and a size in a frequency direction of an empty band is set to be larger than a segment size in the first communication device 100 for which spectrum allocation has been previously performed. Thereby, if a subchannel size is less than or equal to the segment size, allocation is possible in an arbitrary segment size.

Figure 13:
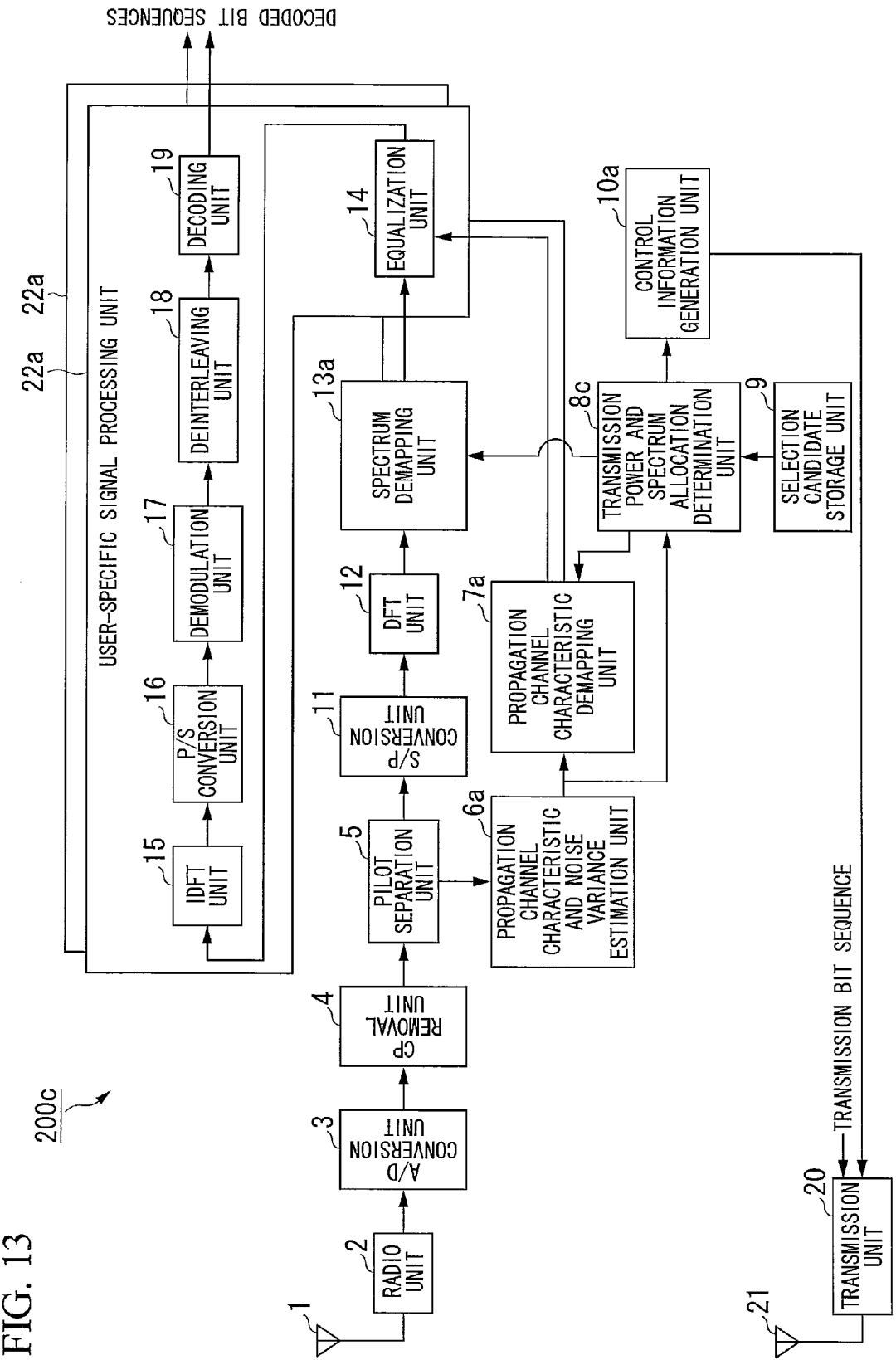
FIG. 13 is a schematic block diagram showing the configuration of a second communication device 200c according to a fourth embodiment of the present invention.

FIG. 13 is a schematic block diagram showing the configuration of the second communication device 200c according to this embodiment. The second communication device 200c includes a reception antenna 1, a radio unit 2, an A/D conversion unit 3, a CP removal unit 4, a pilot separation unit 5, a propagation channel characteristic and noise variance estimation unit 6a, a propagation channel characteristic demapping unit 7a, a transmission power and spectrum allocation determination unit 8c, a selection candidate storage unit 9, a control information generation unit 10a, an S/P conversion unit 11, a DFT unit 12, a spectrum demapping unit 13a, a plurality of user-specific signal processing units 22a, a transmission unit 20, and a transmission antenna 21. The user-specific signal processing unit 22a includes an equalization unit 14, an IDFT unit 15, a P/S conversion unit 16, a demodulation unit 17, a deinterleaving unit 18, and a decoding unit 19. The same reference symbols 1 to 5, 6a, 7a, 9, 10a, 11, 12, 13a, 14 to 21, and 22a are assigned to parts of FIG. 13 corresponding to those of FIG. 8, and description thereof is omitted.

The transmission power and spectrum allocation determination unit 8c is the same as the transmission power and spectrum allocation determination unit 8b (FIG. 11) of the third embodiment in that subchannels into which the entire assignable frequency band is divided for every segment size are set as units, and segmented subcarriers are arranged in the subchannels, when spectrum allocation is performed on each of the first communication devices 100, but is different from the transmission power and spectrum allocation determination unit 8b (FIG. 11) of the third embodiment in that a segment size is set to a value less than or equal to a segment size of a first communication device 100 for which spectrum allocation has been previously performed when subcarriers are arranged.

Figure 14:
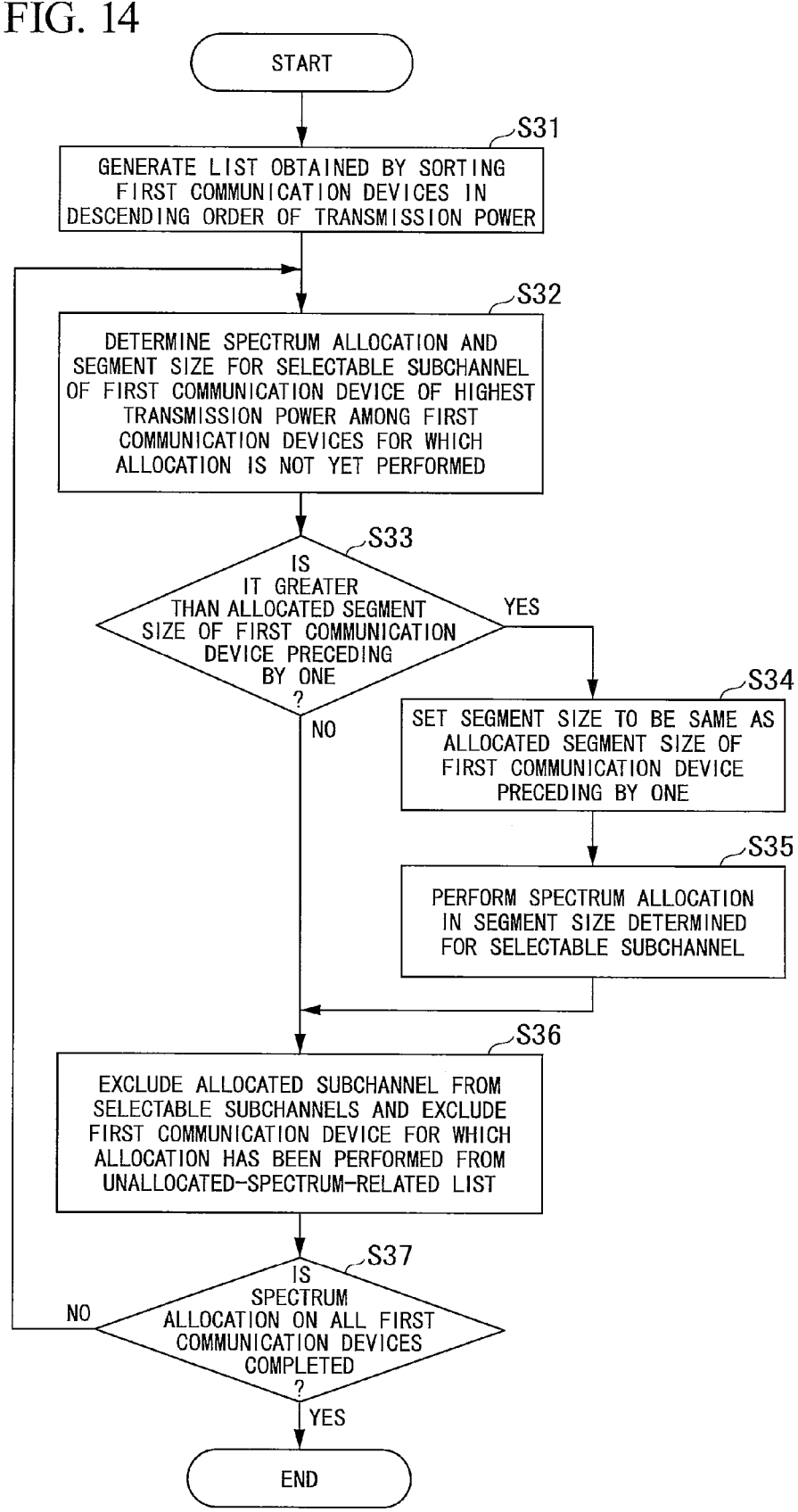
FIG. 14 is a flowchart illustrating the operation of a spectrum allocation process of a transmission power and spectrum allocation determination unit 8c according to the same embodiment.

FIG. 14 is a flowchart illustrating the operation of a spectrum allocation process of the transmission power and spectrum allocation determination unit 8c according to this embodiment. First, in step S31, the transmission power and spectrum allocation determination unit 8c calculates attenuation amounts for the respective first communication devices 100 from estimated propagation channel characteristics or distance attenuations, and generates an unallocated-spectrum-related list by sorting first communication devices 100 in descending order of average transmission powers defined according to the attenuation amounts.

Next, in step S32, the transmission power and spectrum allocation determination unit 8c determines a segment size (and a reduction amount of transmission power) and spectrum allocation for a top-level first communication device 100 of the unallocated-spectrum-related list, that is, a first communication device 100 having highest average transmission power among first communication devices 100 to which the spectrum is not yet allocated.

The segment size and the spectrum allocation in step S32 are determined by the same process as that of steps S1 to S7 of FIG. 6 according to the first embodiment. However, in step S32 of this embodiment, unlike steps S1 to S7, a segment arrangement position is limited to a subcarrier unit based on a first determined segment size upon spectrum allocation.

Next, in step S33, the transmission power and spectrum allocation determination unit 8c determines whether or not the segment size determined in step S32 is greater than a segment size determined for a first communication device 100 preceding by one on the unallocated-spectrum-related list.

When it is determined that it is not greater, the transmission power and spectrum allocation determination unit 8c determines to use the segment size determined in step S32 and the spectrum allocation and makes the transition to step S36. On the other hand, when it is determined that it is greater in step S33, the transmission power and spectrum allocation determination unit 8c makes the transition to step S34, and determines the segment size determined for the first communication device 100 preceding by one on the unallocated-spectrum-related list as the segment size of the top-level first communication device of the unallocated-spectrum-related list. Next, in step S35, the transmission power and spectrum allocation determination unit 8c performs spectrum allocation on a selectable subchannel from which the best reception quality Q is obtainable in the segment size determined in step S34, and makes the transition to step S36.

In step S36, the transmission power and spectrum allocation determination unit 8c excludes the subchannel allocated to the top-level first communication device 100 of the unallocated-spectrum-related list from selectable subchannels, and also excludes the first communication device 100 for which allocation has been performed from the unallocated-spectrum-related list. Next, in step S37, the transmission power and spectrum allocation determination unit 8c determines whether or not spectrum allocation for all of the first communication devices 100 is completed by whether or not any first communication device 100 remains in the unallocated-spectrum-related list. When it is determined that it is not completed, that is, that a first communication device 100 remains in the unallocated-spectrum-related list, the transmission power and spectrum allocation determination unit 8c iterates a subsequent process by returning to step S32. On the other hand, when it is determined that allocation to all the first communication devices 100 is completed, that is, that no first communication device 100 remains in the unallocated-spectrum-related list, in step S37, the spectrum allocation process is terminated.

Since the second communication device 200c performs spectrum allocation on first communication devices 100 in descending order of average transmission power, sets a segment size of a first communication device 100 having highest average transmission power as a subchannel size, and determines spectrum allocation for the other first communication devices 100 so that a segment size which is less than or equal to a determined segment size of a first communication device 100 preceding by one is used, it is possible to prevent spectrum allocation processing from being complicated by using subchannels as in the third embodiment, and it is possible to obtain excellent transmission efficiency using a segment size less than or equal to a subchannel size while suppressing a processing amount.

Fifth Embodiment

A mobile communication system which is a wireless communication system according to the fifth embodiment of the present invention will now be described with reference to the drawings. The wireless communication system according to this embodiment is a mobile communication system having first communication devices 100 as a plurality of mobile station devices and a second communication device 200d as a base station device.

Figure 15:
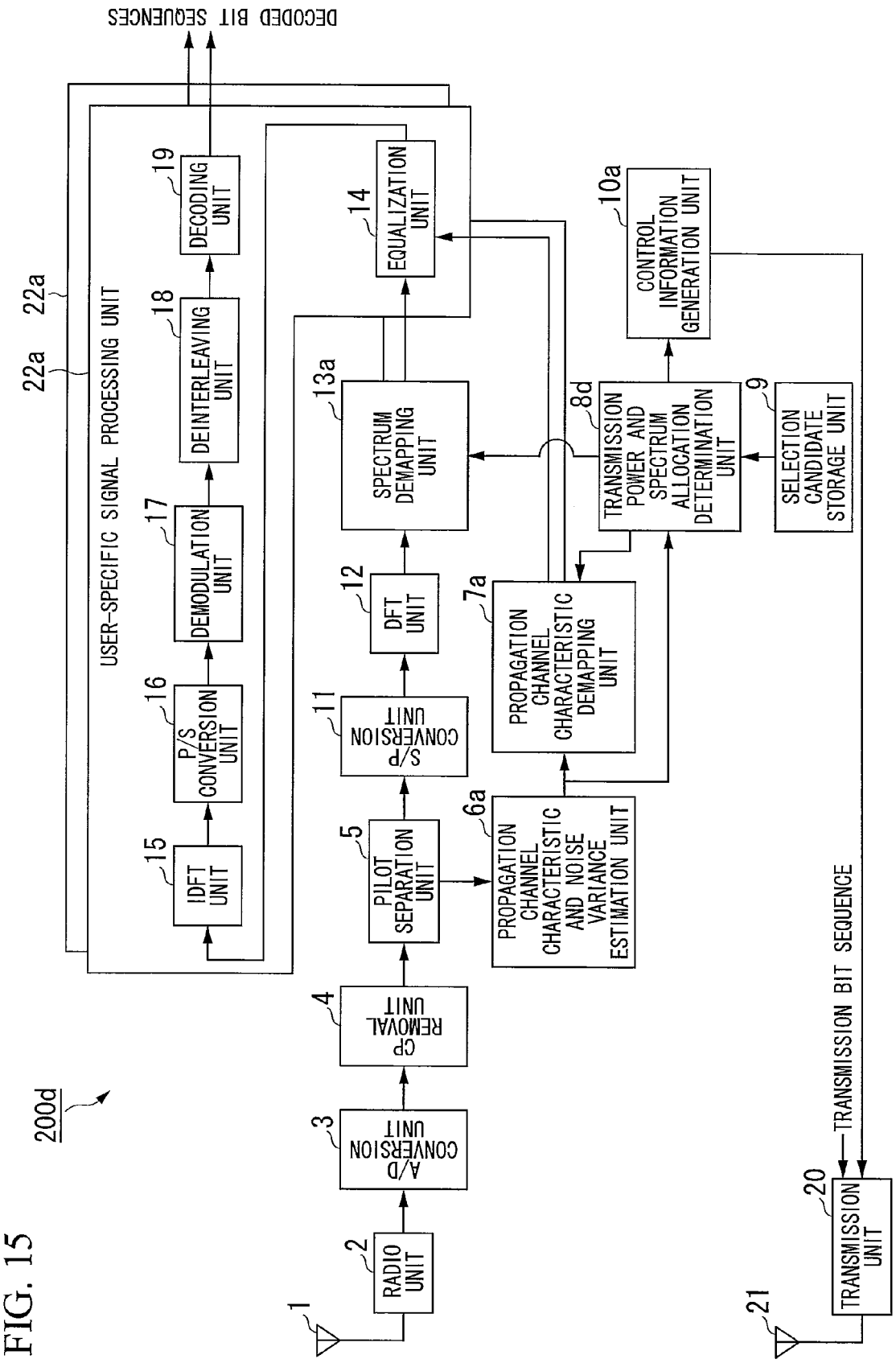
FIG. 15 is a schematic block diagram showing the configuration of a second communication device 200d according to a fifth embodiment of the present invention.

FIG. 15 shows a schematic block diagram showing the configuration of the second communication device 200d according to this embodiment. The second communication device 200d includes a reception antenna 1, a radio unit 2, an A/D conversion unit 3, a CP removal unit 4, a pilot separation unit 5, a propagation channel characteristic and noise variance estimation unit 6a, a propagation channel characteristic demapping unit 7a, a transmission power and spectrum allocation determination unit 8d, a selection candidate storage unit 9, a control information generation unit 10a, an S/P conversion unit 11, a DFT unit 12, a spectrum demapping unit 13a, a plurality of user-specific signal processing units 22a, a transmission unit 20, and a transmission antenna 21. The user-specific signal processing unit 22a includes an equalization unit 14, an IDFT unit 15, a P/S conversion unit 16, a demodulation unit 17, a deinterleaving unit 18, and a decoding unit 19. The same reference symbols 1 to 5, 6a, 7a, 9, 10a, 11, 12, 13a, 14 to 21, and 22a are assigned to parts of FIG. 15 corresponding to those of FIG. 8, and description thereof is omitted.

The transmission power and spectrum allocation determination unit 8d determines, as a segment size of a current first communication device 100, a smallest segment size among segment sizes stored by the selection candidate storage unit 9 in associated with reduction amounts $\Delta P$ of average transmission powers, which are less than a value obtained by adding a difference between average transmission power of a first communication device 100 for which a segment size has been previously determined and average transmission power determined based on an attenuation amount of a first communication device 100 determining a current segment size to a reduction amount $\Delta P$ stored by the selection candidate storage unit 9 in association with the previously determined segment size.

For example, the case where the previously determined segment size is "4" will be described. First, a reduction amount $\Delta P$ of average transmission power stored by the selection candidate storage unit 9 (Table 1) in association with the segment size "4" is "1.6 dB" and a reduction amount $\Delta P$ of average transmission power stored by the selection candidate storage unit 9 (Table 1) in association with the segment size "1" is "2.9 dB." Thus, when the previously determined segment size is "4," a difference between average transmission powers in the segment size "1" is allowable is "1.3 dB," which is a difference between "2.9 dB" and "1.6 dB."

That is, if the average transmission power of a k'-th first communication device 100 is at least "1.3 dB" lower than that of a k-th first communication device 100 when a segment size of the k'-th first communication device 100 having high average transmission power next to the k-th first communication device 100 of the segment size 4 is determined, the segment size is set as 1. At this time, since segment sizes of all of the remaining first communication devices 100 to which a spectrum is not yet allocated become "1," subcarriers may be alternately allocated.

Likewise, if the segment size is "32" and a difference of average transmission power of the k'-th first communication device 100 is "1.7 dB," the smallest segment size "4" is selected from among segment sizes associated with average-transmission-power reduction amounts $\Delta P$ of "1.7 dB" or less.

It is possible to determine a segment size of highest cell throughput for each first communication device 100 under a limit of transmission power by calculating a difference of average transmission power of each first communication device 10 sorted in descending order of average transmission power and determining the segment size as described above.

The above-described transmission power and spectrum allocation determination unit 8d determines average transmission power based on an attenuation amount of a first communication device 100 for first communication devices other than a first communication device 100 of a largest attenuation amount, and uses a segment size in which peak power at the time of using average transmission power determined based on an attenuation amount does not exceed a predetermined threshold value (for example, at a probability of 99%) by using a segment size of a selection candidate selected from among selection candidates indicating higher average transmission powers than the average transmission power. Accordingly, segment conditions in which peak power does not exceed the threshold value may be defined based on a first communication device 100 for which a segment size has been previously determined as described above, and conditions may be defined based on a first communication device 100 for which a segment size has been first determined.

In this case, as a segment size of a current first communication device 100, a smallest segment size is determined among segment sizes stored by the selection candidate storage unit 9 in association with reduction amounts $\Delta P$ of average transmission powers, which are less than a value obtained by adding a difference between average transmission power of a first communication device 100 for which a segment size has been first determined and average transmission power determined based on a reduction amount of a first communication device 100 determining a current segment size to a reduction amount $\Delta P$ stored by the selection candidate storage unit 9 in association with the first determined segment size.

Figure 16:
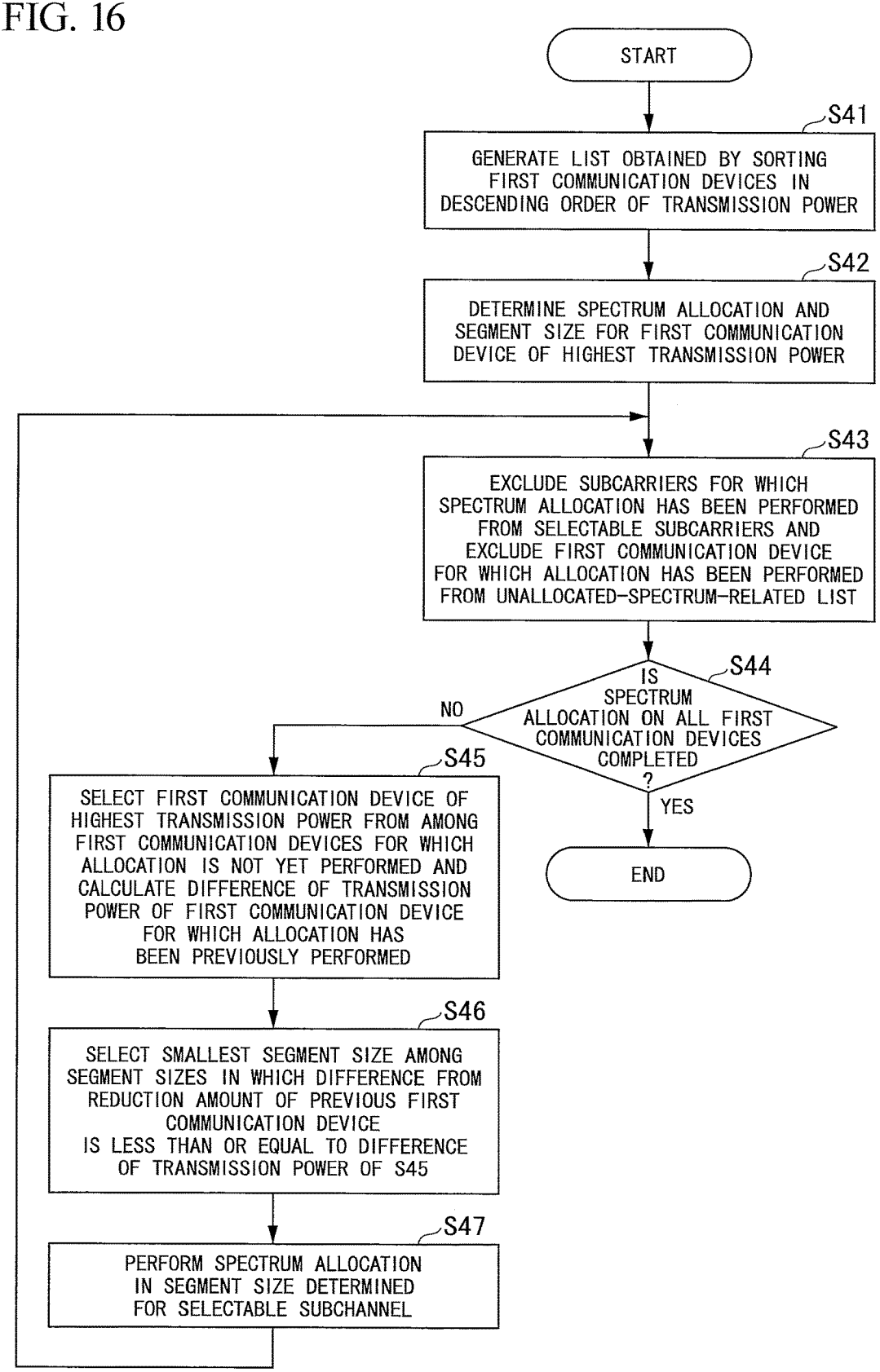
FIG. 16 is a flowchart illustrating the operation of a spectrum allocation process of a transmission power and spectrum allocation determination unit 8d according to the same embodiment.
Figure 17B:
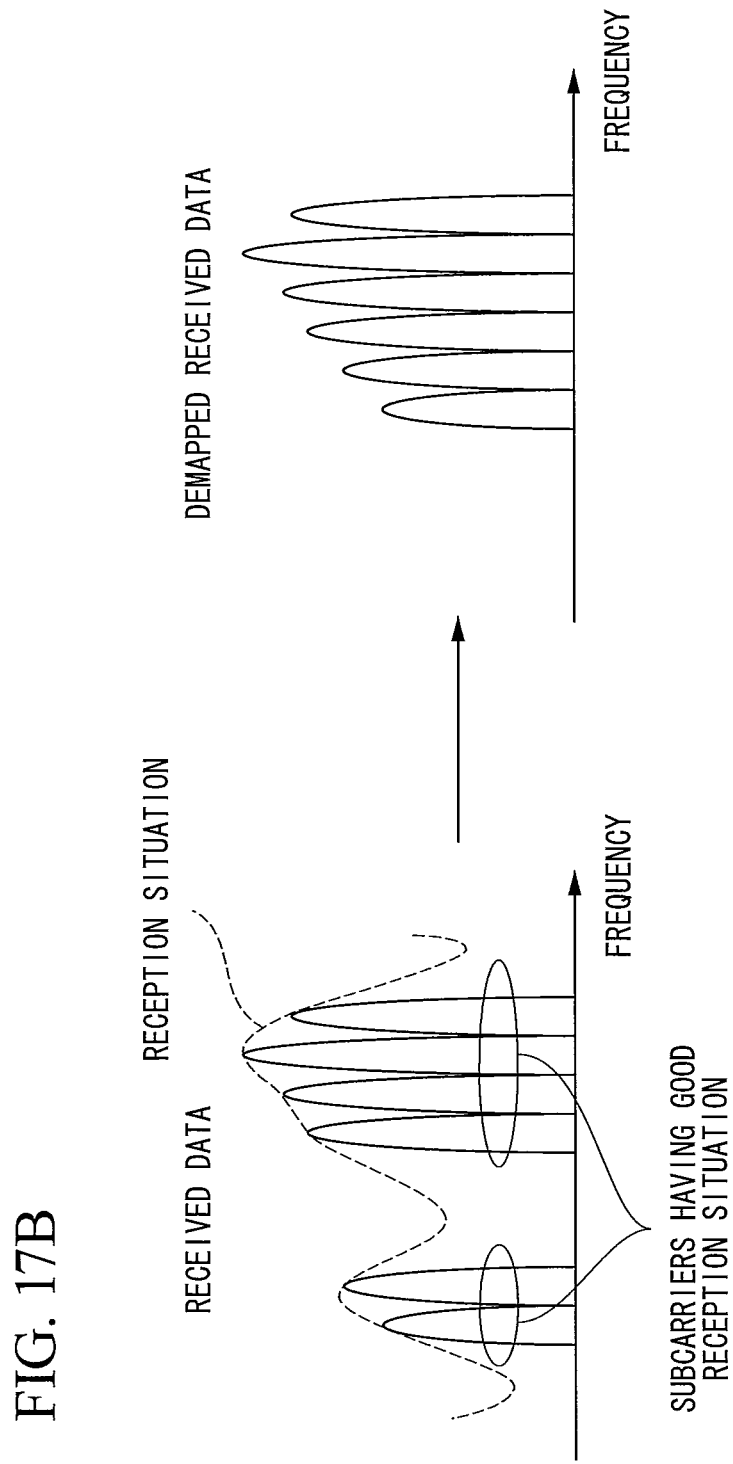
FIG. 17B is a diagram showing a reception spectrum of an SC-ASA scheme of the related art.
Figure 18A:
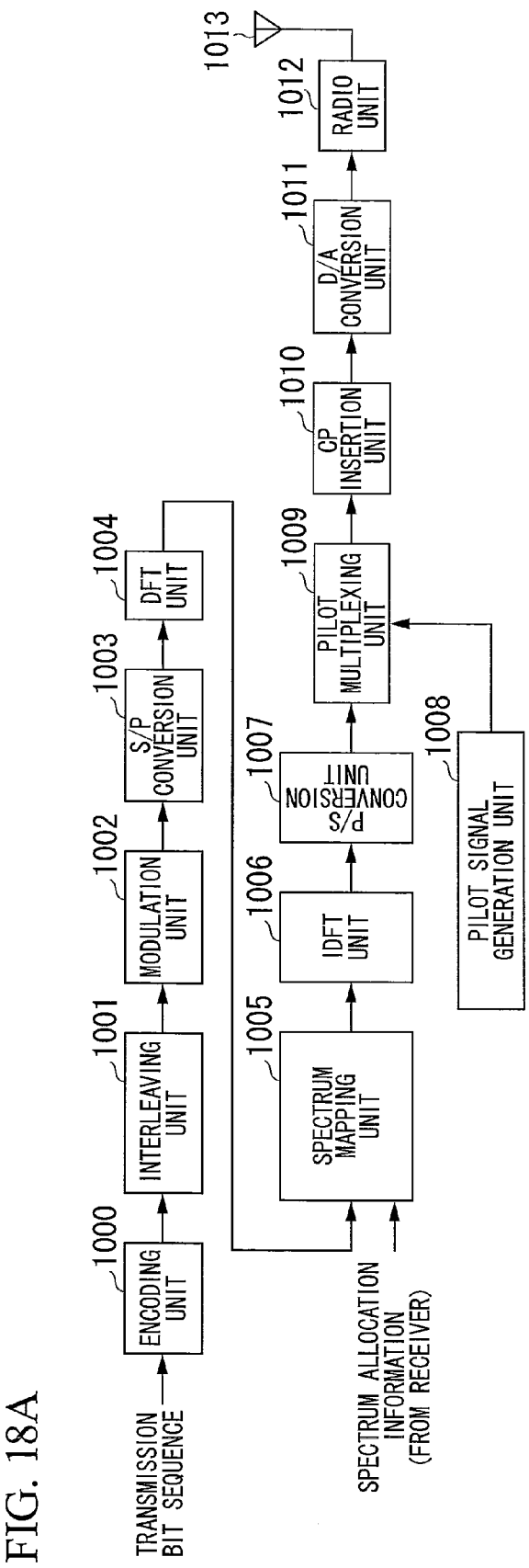
FIG. 18A is a schematic block diagram showing the configuration of a transmission station device which transmits information by applying an SC-ASA communication scheme of the related art.
Figure 18B:
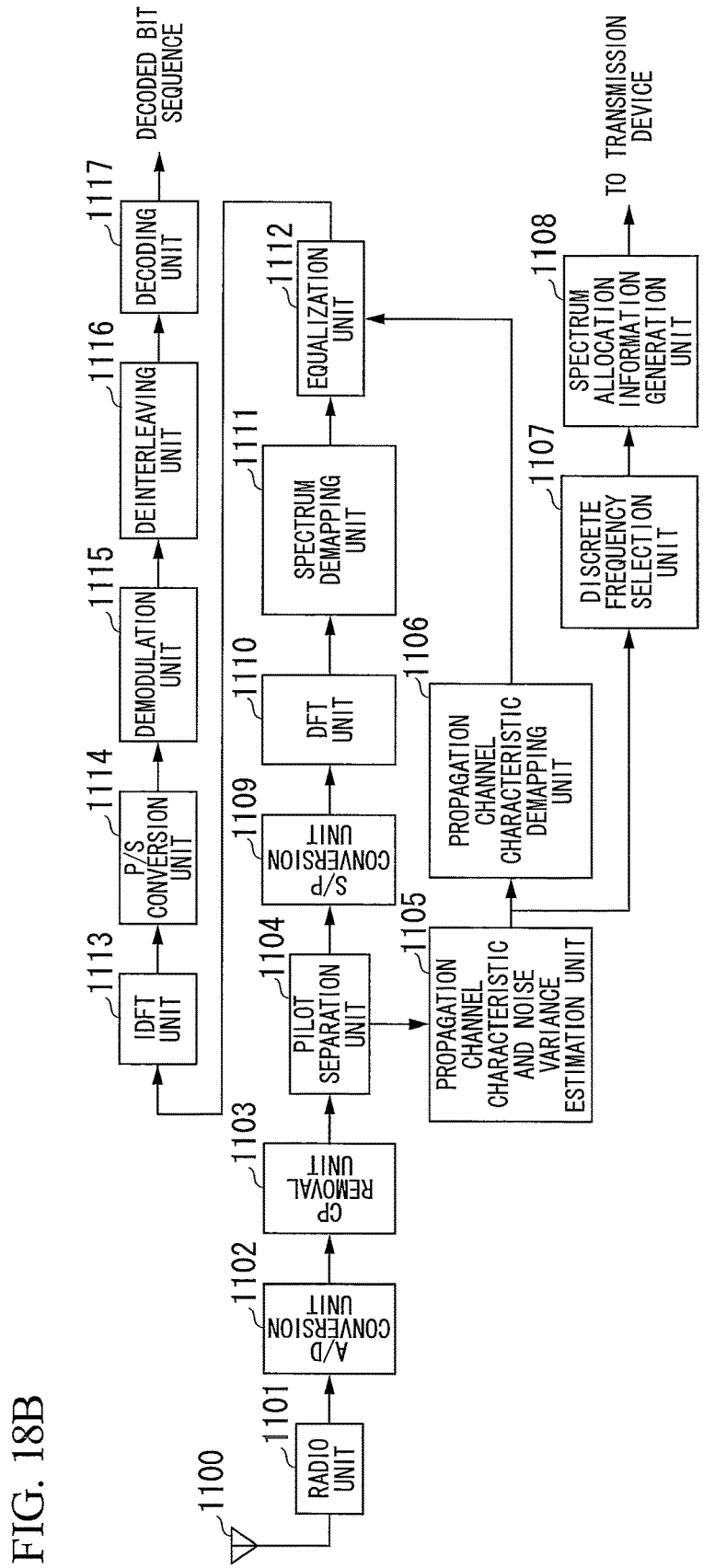
FIG. 18B is a schematic block diagram showing the configuration of a reception station device which receives information by applying an SC-ASA communication scheme of the related art.

FIG. 16 is a flowchart illustrating the operation of a spectrum allocation process of the transmission power and spectrum allocation determination unit 8d according to this embodiment. First, in step S41, the transmission power and spectrum allocation determination unit 8d calculates attenuation amounts for the respective first communication devices 100 from estimated propagation channel characteristics or distance attenuations, and generates an unallocated-spectrum-related list by sorting first communication devices 100 in descending order of average transmission powers defined according to the attenuation amounts.

Next, in step S42, the transmission power and spectrum allocation determination unit 8d determines a segment size (and a reduction amount of transmission power) and spectrum allocation for a top-level first communication device 100 of the unallocated-spectrum-related list, that is, a first communication device 100 having highest average transmission power. The segment size and the spectrum allocation in step S42 are determined by the same process as that of steps S1 to S7 of FIG. 6 according to the first embodiment.

Next, in step S43, the transmission power and spectrum allocation determination unit 8d excludes allocated subcarriers from selectable subcarriers upon allocation to other first communication devices, and excludes a first communication device 100 for which allocation has been performed from the unallocated-spectrum-related list generated in step S41. Next, in step S44, the transmission power and spectrum allocation determination unit 8d determines whether or not spectrum allocation for all of the first communication devices 100 is completed by whether or not any first communication device 100 remains in the unallocated-spectrum-related list. When it is determined that the spectrum allocation is not completed, that is, that a first communication device 100 remains in the unallocated-spectrum-related list, the transmission power and spectrum allocation determination unit 8d makes the transition to step S45.

In step S45, the transmission power and spectrum allocation determination unit 8d calculates a difference between average transmission power of a top-level first communication device 100 of the unallocated-spectrum-related list and average transmission power of a first communication device 100 for which spectrum allocation has been previously performed. Next, in step S46, the transmission power and spectrum allocation determination unit 8d selects a smallest segment size among segment sizes stored by the selection candidate storage unit 9 in association with a reduction amount ΔP when a difference from a reduction amount ΔP of average transmission power of the first communication device 100 for which the spectrum allocation has been previously performed is smaller than the difference calculated in step S45. Next, in step S46, the transmission power and spectrum allocation determination unit 8d performs spectrum allocation on the top-level first communication device 100 of the unallocated-spectrum-related list to selectable subcarriers according to the segment size selected in step S46, returns to step S43, and performs spectrum allocation on all the first communication devices 100 by iterating a subsequent process.

On the other hand, when it is determined that no first communication device 100 remains in the unallocated-spectrum-related list, that is, that no first communication device 100 for which spectrum allocation is not yet performed remains, in step S44, the transmission power and spectrum allocation determination unit 8d terminates the process.

In this embodiment as described above, it is possible to improve transmission efficiency, that is, cell throughput, of the entire wireless communication system since a smallest segment size as a segment size having a highest degree of freedom of spectrum allocation among segment sizes in which peak power does not exceed the limit power of a linear region of an amplifier is selected for all first communication devices 100.

Such a processing unit 30 may be implemented by dedicated hardware. The processing unit 30 may include a memory and a central processing unit (CPU), and the function thereof may be implemented by loading a program for implementing the function of the processing unit 30 to the memory and executing the program.

A computer-readable recording medium may record a program for implementing functions of the spectrum mapping unit 36 and the control unit 47 in FIG. 1, the propagation channel characteristic and noise variance estimation unit 6, the propagation channel characteristic demapping unit 7, the transmission power and spectrum allocation determination unit 8, the control information generation unit 10, and the spectrum demapping unit 13 in FIG. 2, the propagation channel characteristic and noise variance estimation unit 6a, the propagation channel characteristic demapping unit 7a, the transmission power and spectrum allocation determination unit 8a, the control information generation unit 10a, and the spectrum demapping unit 13a in FIG. 8, the propagation channel characteristic and noise variance estimation unit 6a, the propagation channel characteristic demapping unit 7a, the transmission power and spectrum allocation determination unit 8b, the control information generation unit 10a, and the spectrum demapping unit 13a in FIG. 11, the propagation channel characteristic and noise variance estimation unit 6a, the propagation channel characteristic demapping unit 7a, the transmission power and spectrum allocation determination unit 8c, the control information generation unit 10a, and the spectrum demapping unit 13a in FIG. 13, and the propagation channel characteristic and noise variance estimation unit 6a, the propagation channel characteristic demapping unit 7a, the transmission power and spectrum allocation determination unit 8d, the control information generation unit 10a, and the spectrum demapping unit 13a in FIG. 15. A computer system may read and execute the program recorded on the recording medium to perform the process of each part. Here, the "computer system" includes an OS and hardware such as peripheral devices.

The "computer-readable recording medium" is a portable medium such as a flexible disc, magneto-optical disc, ROM and CD-ROM, and a storage device, such as a hard disk, built in the computer system. Furthermore, the "computer readable recording medium" may also include a medium that dynamically holds a program for a short period of time, such as a communication line when a program is transmitted via a network such as the Internet or a communication network such as a telephone network, and a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described in detail with reference to the drawings. However, specific configurations are not limited to the embodiments and may include any design in the scope without departing from the subject matter of the present invention.

INDUSTRIAL APPLICABILITY

The present invention is suitable for use in a mobile communication system, but is not limited thereto.

REFERENCE SYMBOLS

1: Receiving antenna
2: Radio unit
3: A/D conversion unit
4: CP removal unit

5: Pilot separation unit
6, 6a: Propagation channel characteristic and noise variance estimation unit
7, 7a: Propagation channel characteristic demapping unit
8, 8a, 8b, 8c, 8d: Transmission power and spectrum allocation determination unit
9: Selection candidate storage unit
10, 10a: Control information generation unit
11: S/P conversion unit
12: DFT unit
13, 13a: Spectrum demapping unit
14: Equalization unit
15: IDFT unit
16: P/S conversion unit
17: Demodulation unit
18: Deinterleaving unit
19: Decoding unit
20: Transmission unit
21: Transmitting antenna
22a: User-specific signal processing unit
31: Encoding unit
32: Interleaving unit
33: Modulation unit
34: S/P conversion unit
35: DFT unit
36: Spectrum mapping unit
37: IDFT unit
38: P/S conversion unit
39: Pilot multiplexing unit
40: CP insertion unit
41: D/A conversion unit
42: Radio unit
43: Transmitting antenna
44: Pilot signal generation unit
45: Receiving antenna
46: Reception unit
47: Control unit
100: First communication device
200, 200a, 200b, 200c, 200d: Second communication device

The invention claimed is:

1. A communication device comprising:
reception circuitry configured to receive control data including allocation information;
transmission circuitry configured to transmit a Discrete Fourier Transform-spread-OFDM (DFT-S-OFDM) signal;
mapping circuitry configured to allocate the DFT-S-OFDM signal to a plurality of subcarriers based on the allocation information, wherein
the allocation information indicates one of a first allocation method and a second allocation method,
the first allocation method allocates the plurality of subcarriers continuously to form a single segment of subcarriers, and
the second allocation method non-continuously allocates the plurality of subcarriers in at least a first segment and a second segment, the first segment including a first portion of the plurality of subcarriers continuously allocated to form the first segment, and the second segment including a second portion of the plurality of subcarriers continuously allocated to form the second segment; and
control circuitry configured to determine a reduction amount by which to reduce a transmission power for transmitting the DFT-S-OFDM signal so that the reduction amount becomes smaller as a segment size is increased, wherein
the segment size indicates a number of subcarriers included in each segment, and
the control circuitry is configured to, in a case that the segment size is a first segment size, determine the reduction amount by:
calculating, for each of a plurality of segment sizes, an average value of the transmission power, thus obtaining a plurality of average values for the plurality of segment sizes including a first average value for the first segment size,
determining a second segment size corresponding to a second average value that is maximum among the plurality of average values, and
calculating, as the reduction amount, a difference between the first average value and the second average value.

2. The communication device according to claim 1, wherein
a spectrum allocation determination circuitry is configured to determine the allocation information based on a quality of the DFT-S-OFDM signal.

3. The communication device according to claim 2, wherein
the quality of the DFT-S-OFDM signal is obtained after equalization process is performed.

4. The communication device according to claim 1, wherein
the reduction amount of the transmission power is determined based on a peak to average power ratio (PAPR) or a cubic metric (CM).

5. A communication method comprising:
receiving control data including allocation information;
transmitting a Discrete Fourier Transform-spread-OFDM (DFT-S-OFDM) signal;
allocating the DFT-S-OFDM signal to a plurality of subcarriers based on the allocation information, wherein
the allocation information indicates one of a first allocation method and a second allocation method,
the first allocation method allocates the plurality of subcarriers continuously to form a single segment of subcarriers, and
the second allocation method non-continuously allocates the plurality of subcarriers in at least a first segment and a second segment, the first segment including a first portion of the plurality of subcarriers continuously allocated to form the first segment, and the second segment including a second portion of the plurality of subcarriers continuously allocated to form the second segment; and
determining a reduction amount by which to reduce a transmission power for transmitting the DFT-S-OFDM signal so that the reduction amount becomes smaller as a segment size is increased, wherein
the segment size indicates a number of subcarriers included in each segment, and
in a case that the segment size is a first segment size, determining the reduction amount comprises:
calculating, for each of a plurality of segment sizes, an average value of the transmission power, thus obtaining a plurality of average values for the plurality of segment sizes including a first average value for the first segment size, determining a second segment size corresponding to a second average value that is maximum among the plurality of average values; and calculating, as the reduction amount, a difference between the first average value and the second average value.

6. A communication system which comprises:

a first communication device; and a second communication device, wherein the first communication device comprises:

reception circuitry configured to receive control data including allocation information;

transmission circuitry configured to transmit a Discrete Fourier Transform-spread-OFDM (DFT-S-OFDM) signal;

mapping circuitry configured to allocate the DFT-S-OFDM signal to a plurality of subcarriers based on the allocation information, wherein the allocation information indicates one of a first allocation method and a second allocation method, the first allocation method allocates the plurality of subcarriers continuously to form a single segment of subcarriers, and the second allocation method non-continuously allocates the plurality of subcarriers in at least a first segment and a second segment, the first segment including a first portion of the plurality of subcarriers continuously allocated to form the first segment, and the second segment including a second portion of the plurality of subcarriers continuously allocated to form the second segment; and control circuitry configured to determine a reduction amount by which to reduce a transmission power for transmitting the DFT-S-OFDM signal so that the reduction amount becomes smaller as a segment size is increased, wherein the segment size indicates a number of subcarriers included in each segment, and the control circuitry is configured to, in a case that the segment size is a first segment size, determine the reduction amount by:

calculating, for each of a plurality of segment sizes, an average value of the transmission power, thus obtaining a plurality of average values for the plurality of segment sizes including a first value for the first segment size, determining a second segment size corresponding to a second average value that is maximum among the plurality of average values, and calculating, as the reduction amount, a difference between the first average value and the second average value.

* * * * *